United States Patent
Ulizio et al.

(10) Patent No.: US 10,922,633 B2
(45) Date of Patent: Feb. 16, 2021

(54) UTILIZING ECONOMETRIC AND MACHINE LEARNING MODELS TO MAXIMIZE TOTAL RETURNS FOR AN ENTITY

(71) Applicant: Accenture Global Solutions Limited, Dublin (IE)

(72) Inventors: Rachael Ulizio, Riverwoods, IL (US); Rohit Malhotra, Noida (IN); Wolfgang Popp, Munich (DE); Shishir A. Shroff, Somerset, NJ (US); Rahul Chakraborty, Gurgaon (IN); Shilpa Sardar, Gurgaon (IN)

(73) Assignee: Accenture Global Solutions Limited, Dublin (IE)

( * ) Notice: Subject to any disclaimer, the term of this patent is extended or adjusted under 35 U.S.C. 154(b) by 69 days.

(21) Appl. No.: 16/232,552

(22) Filed: Dec. 26, 2018

(65) Prior Publication Data

US 2020/0210907 A1 Jul. 2, 2020

(51) Int. Cl.
*G06Q 10/04* (2012.01)
*G06Q 10/06* (2012.01)
(Continued)

(52) U.S. Cl.
CPC ............ *G06Q 10/04* (2013.01); *G06F 17/11* (2013.01); *G06N 20/00* (2019.01); *G06Q 10/067* (2013.01)

(58) Field of Classification Search
CPC .... G06Q 40/00; G06Q 40/06; G06Q 10/0637; G06Q 10/0639; G06Q 10/06393; G06Q 10/063; G06Q 10/04; G06Q 10/067
See application file for complete search history.

(56) References Cited

U.S. PATENT DOCUMENTS 7,349,877 B2   3/2008 Ballow et al.
7,925,557 B1*  4/2011 Ficery ............... G06Q 40/00
                                              705/35
(Continued)

FOREIGN PATENT DOCUMENTS

CN   101149833 A   3/2008
CN   107609771 A   1/2018

OTHER PUBLICATIONS

Zhang, Wei-Bin, Differential Equations, Bifurcations and Chaos in Economics World Scientific Publishing, 2005 (Year: 2005).*
(Continued)

*Primary Examiner* — Scott L Jarrett
(74) *Attorney, Agent, or Firm* — Harrity & Harrity, LLP

(57) ABSTRACT

A device receives and processes current, forecasted, and historical entity information, associated with an entity, to generate processed information. The device calculates an operating enterprise value for the entity based on the processed information and bifurcates the operating enterprise value into a current value associated with current operations of the entity and a future value associated with investments of the entity. The device determines a growth rate based on the current value and the future value, and processes the current value, the future value, and the growth rate, with a first model, to determine underlying drivers of total returns for stakeholders associated with the entity. The device processes the underlying drivers of total returns for stakeholders and revenue, costs, assets, and liabilities associated with the entity, with a second model, to identify analytics data for the entity, and performs actions based on the analytics data identified for the entity.

19 Claims, 20 Drawing Sheets

(51) Int. Cl.
*G06F 17/11* (2006.01)
*G06N 20/00* (2019.01)

(56) References Cited

U.S. PATENT DOCUMENTS

| | | | | |
|---|---|---|---|---|
| 7,937,304 | B2* | 5/2011 | Melnicoff | G06Q 10/10 |
| | | | | 705/35 |
| 8,660,886 | B1* | 2/2014 | McLean | G06Q 10/0637 |
| | | | | 705/7.39 |
| 2005/0004832 | A1* | 1/2005 | Ostergard | G06Q 40/06 |
| | | | | 705/35 |
| 2005/0209942 | A1* | 9/2005 | Ballow | G06Q 40/06 |
| | | | | 705/35 |
| 2005/0209943 | A1* | 9/2005 | Ballow | G06Q 40/00 |
| | | | | 705/35 |
| 2005/0209944 | A1* | 9/2005 | Ballow | G06Q 40/04 |
| | | | | 705/35 |
| 2005/0209945 | A1* | 9/2005 | Ballow | G06Q 40/00 |
| | | | | 705/35 |
| 2005/0209946 | A1* | 9/2005 | Ballow | G06Q 40/06 |
| | | | | 705/35 |
| 2005/0209948 | A1* | 9/2005 | Ballow | G06Q 10/0639 |
| | | | | 705/36 R |
| 2005/0262014 | A1* | 11/2005 | Fickes | G06Q 40/06 |
| | | | | 705/38 |
| 2005/0273404 | A1* | 12/2005 | Ostergard | G06Q 40/06 |
| | | | | 705/35 |
| 2008/0140584 | A1* | 6/2008 | Hylton | G06Q 40/00 |
| | | | | 705/36 R |
| 2012/0041890 | A1* | 2/2012 | Ng | G06Q 40/06 |
| | | | | 705/36 R |
| 2012/0323641 | A1* | 12/2012 | Chu | G06Q 10/063 |
| | | | | 705/7.39 |
| 2013/0197675 | A1* | 8/2013 | McCarthy | G06Q 10/06393 |
| | | | | 700/28 |
| 2016/0171398 | A1 | 6/2016 | Eder | |
| 2017/0185934 | A1 | 6/2017 | Richards et al. | |

OTHER PUBLICATIONS

Finlistics Solutions, "Master the Art of Finlistics' Insight-LED Selling", https://www.finlistics.com/, Sep. 11, 2018, 8 pages.
Factiva, "Global News Database & Licensed Content", https://www.dowjones.com/products/factiva/, Sep. 16, 2016, 14 pages.
Databook, "Close deals faster with value-driven selling", https://www.trydatabook.com/, Feb. 24, 2018, 5 pages.

* cited by examiner

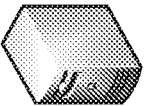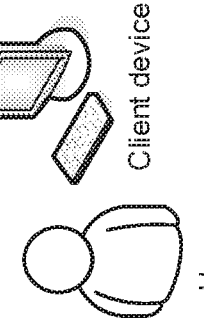
FIG. 1K

UTILIZING ECONOMETRIC AND MACHINE LEARNING MODELS TO MAXIMIZE TOTAL RETURNS FOR AN ENTITY

BACKGROUND

An employee of an entity (e.g., a corporation, a business unit of a corporation, a government agency, and/or the like) may be required to make decisions that affect the entity, stakeholders in the entity, and/or the like. The employee may make the decisions based on information, associated with the entity, that is received from multiple information sources.

SUMMARY

According to some implementations, a method may include receiving current entity information, forecasted entity information, and historical entity information associated with an entity and processing the current entity information, the forecasted entity information, and the historical entity information to generate processed information. The method may include calculating an operating enterprise value for the entity based on the processed information and bifurcating the operating enterprise value into a current value associated with current operations of the entity and a future value associated with investments of the entity. The method may include determining a growth rate for the entity based on the current value and the future value, and processing the current value, the future value, and the growth rate, with a first model, to determine underlying drivers of total returns for stakeholders associated with the entity. The method may include processing the underlying drivers of total returns for stakeholders and revenue, costs, assets, and liabilities associated with the entity, with a second model, to identify analytics data for the entity and performing one or more actions based on the analytics data identified for the entity.

According to some implementations, a device may include one or more memories and one or more processors, communicatively coupled to the one more memories, to receive current entity information, forecasted entity information, and historical entity information associated with an entity and receive current competitor information and historical competitor information associated with competitors of the entity. The one or more processors may process the current entity information, the forecasted entity information, the historical entity information, the current competitor information, and the historical competitor information to generate processed information, and may calculate an operating enterprise value for the entity based on the processed information. The one or more processors may divide the operating enterprise value into a current value associated with current operations of the entity and a future value associated with investments of the entity and may determine a growth rate for the entity based on the current value and the future value. The one or more processors may process the current value, the future value, and the growth rate, with a first model, to determine underlying drivers of total returns for stakeholders associated with the entity and may process the underlying drivers of total returns for stakeholders and revenue, costs, assets, and liabilities associated with the entity, with a second model, to identify analytics data for the entity. The one or more processors may perform one or more actions based on the analytics data identified for the entity.

According to some implementations, a non-transitory computer-readable medium may store instructions that include one or more instructions that, when executed by one or more processors of a device, cause the one or more processors to receive current entity information, forecasted entity information, and historical entity information associated with an entity and receive current competitor information and historical competitor information associated with competitors of the entity. The one or more instructions may cause the one or more processors to process the current entity information, the forecasted entity information, the historical entity information, the current competitor information, and the historical competitor information to generate processed information, and calculate an operating enterprise value for the entity based on the processed information. The one or more instructions may cause the one or more processors to bifurcate the operating enterprise value into a current value associated with current operations of the entity and a future value associated with investments of the entity and determine a growth rate for the entity based on the current value and the future value. The one or more instructions may cause the one or more processors to process the current value, the future value, and the growth rate, with a first model, to determine underlying drivers of total returns for stakeholders associated with the entity and process the underlying drivers of total returns for stakeholders and revenue, costs, assets, and liabilities associated with the entity, with a second model, to identify analytics data for the entity. The analytics data may include one or more of information indicating a competitiveness of the entity with the competitors, information indicating an analyst recommendation for the entity, information indicating a cash cycle for the entity, information indicating a profile for the entity, information indicating an employee productivity analysis for the entity, information indicating operating working capital drivers for the entity, information indicating return on invested capital drivers for the entity, information indicating a scorecard for the entity, and/or the like. The one or more instructions may cause the one or more processors to perform one or more actions based on the analytics data identified for the entity.

DETAILED DESCRIPTION

Figure 1A:
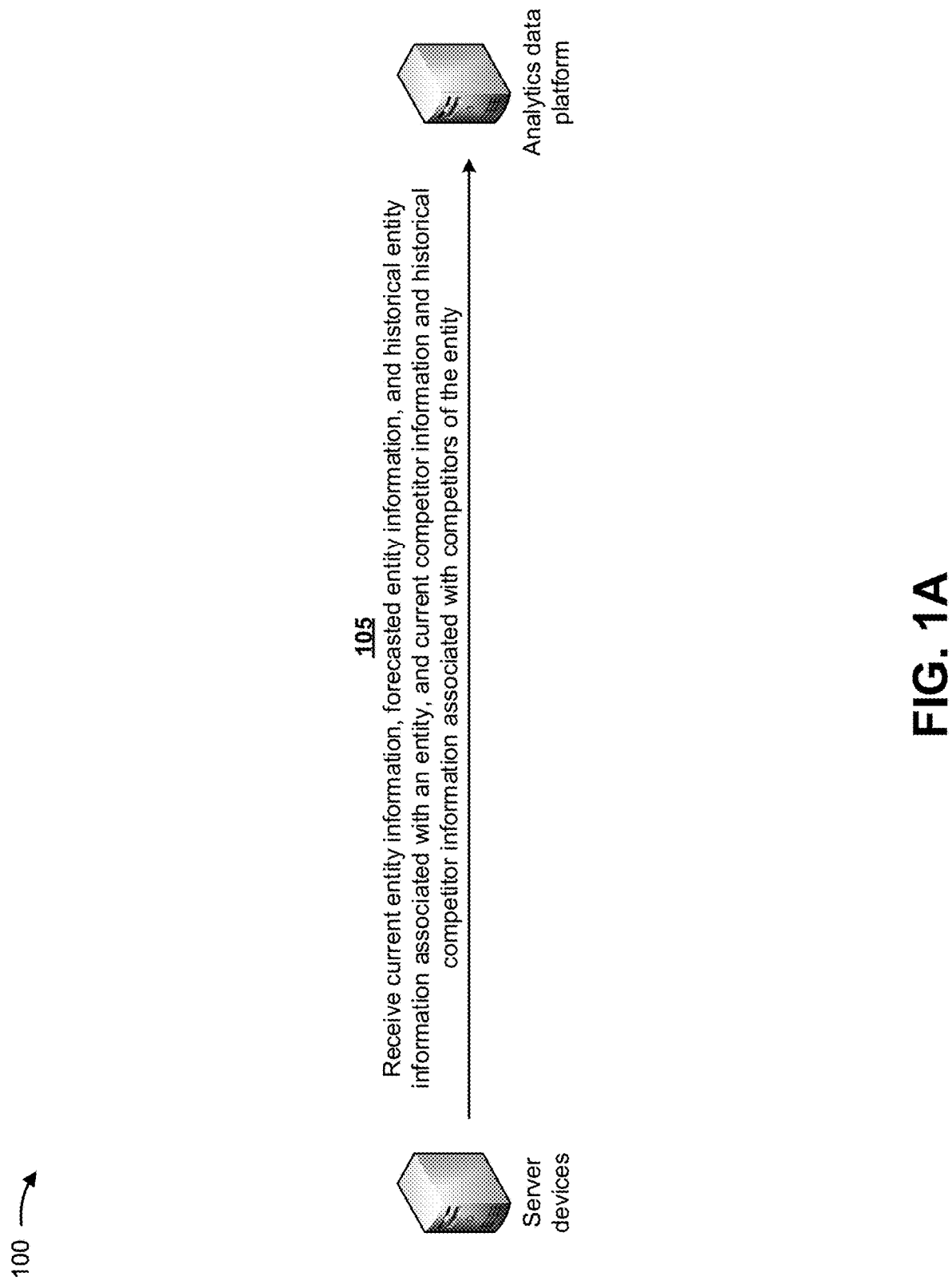
FIGS. 1A-1O are diagrams of an example implementation described herein.

The following detailed description of example implementations refers to the accompanying drawings. The same reference numbers in different drawings may identify the same or similar elements.

An employee of an entity may collect information associated with the entity from multiple disjointed information sources, which is time-consuming for the employee and expensive for the entity. Furthermore, the information often is not current and/or is not collected in real time. Thus, the information does not facilitate decision making by the employee that maximizes returns for stakeholders in the entity in a timely and cost-effective manner.

Some implementations described herein provide analytics data platform that utilizes econometric and machine learning models to identify analytics data (e.g., including financial analytics data) for an entity (e.g., a corporation, a business unit of a corporation, a government agency, and/or the like). For example, the analytics data platform may receive current entity information, forecasted entity information, and historical entity information associated with an entity and may receive current competitor information and historical competitor information associated with competitors of the entity. The analytics data platform may process the current entity information, the forecasted entity information, the historical entity information, the current competitor information, and the historical competitor information to generate processed information, and may calculate an operating enterprise value for the entity based on the processed information. The analytics data platform may divide the operating enterprise value into a current value associated with current operations of the entity and a future value associated with investments of the entity and may determine a growth rate for the entity based on the current value and the future value. The analytics data platform may process the current value, the future value, and the growth rate, with a first model, to determine underlying drivers of total returns for stakeholders associated with the entity and may process the underlying drivers of total returns for stakeholders and revenue, costs, assets, and liabilities associated with the entity, with a second model, to identify analytics data for the entity. The analytics data platform may perform one or more actions based on the analytics data identified for the entity.

In this way, the analytics data platform facilitates decision making by an employee of an entity in a timely and cost-effective manner, maximizes returns for stakeholders in the entity, conserves resources (e.g., processing resources, memory resources, and/or the like) for the entity that would otherwise be wasted attempting to collect and process information from disparate sources for decision-making purposes, and/or the like. The analytics data platform collects information (e.g., current information, real-time information, historical information, and/or the like) that is pertinent to decision making associated with maximizing returns for the stakeholders and utilizes that information to generate analytics data for decision makers and/or to automatically perform one or more actions that maximize returns for stakeholders.

FIGS. 1A-1O are diagrams of an example implementation 100 described herein. As shown in FIG. 1A, one or more server devices may be associated with analytics data platform. In some implementations, one or more of the server devices may be associated with an entity (e.g., a corporation, a business unit of a corporation, a department of a corporation or a business unit, a government agency, a branch of a government agency, and/or the like), one or more competitors of the entity, a third-party data source (e.g., the Security and Exchange Commission (SEC), Reuters®, Glassdoor®, Bloomberg®, Standard and Poor (S&P) Capital IQ, S&P Global Market Intelligence, Xpressfeed™, etc.), and/or the like.

As further shown in FIG. 1A, and by reference number 105, the analytics data platform may receive, from the server devices, current entity information associated with the entity, forecasted entity information associated with the entity, historical entity information associated with the entity, current competitor information associated with the competitors of the entity, historical competitor information associated with the competitors of the entity, and/or the like. In some implementations, the current entity information, the forecasted entity information, the historical entity information, the current competitor information, and/or the historical competitor information may be received from a crawl of the Internet, from scans of internal or external documents (e.g., with respect to the entity), and/or the like.

In some implementations, the current entity information may include current information describing the entity (e.g., describing a product created by the entity, a service offered by the entity, a quantity of employees, and/or the like); current financial information associated with the entity (e.g., information indicating financial activities and conditions of the entity, an income statement of the entity, a balance sheet of the entity, a statement of retained earnings of the entity, a statement of cash flows of the entity, and/or the like); current segment information associated with the entity (e.g., information indicating geographic segments and business segments of the entity); a current analyst rating of the entity (e.g., a rating indicating whether to buy, hold, or sell stock associated with the entity, a rating indicating whether the entity is underperforming or overperforming, and/or the like); current pension information associated with the entity (e.g., information identifying pension plan assets, pension plan expenses, pension benefit obligations, and/or the like); a current share price of a stock associated with the entity; a current dividend yield of the stock associated with the entity; a current total return to shareholders of the stock associated with the entity; current equity information associated with the entity (e.g., information indicating a value determined based on subtracting values of costs and liabilities from values of revenue and assets); current revenue of the entity; current earnings before interest and taxes (EBIT) of the entity; current revenue, costs, assets, and/or liabilities of the entity; and/or the like. In some implementations, the current entity information may be received in real time or near-real time, in that the current entity information is received by the analytics data platform as soon as (or nearly as soon as) the current entity information is generated.

In some implementations, the forecasted entity information may include forecasted information describing the entity, forecasted financial information associated with the entity, forecasted segment information associated with the entity, a forecasted analyst rating of the entity, forecasted pension information associated with the entity, a forecasted share price of a stock associated with the entity, a forecasted dividend yield of the stock associated with the entity, a forecasted total return to shareholders of the stock associated with the entity, forecasted equity information associated with the entity, forecasted revenue of the entity, forecasted earnings before interest and taxes of the entity, forecasted revenue, costs, assets, and/or liabilities of the entity, and/or the like.

In some implementations, the historical entity information may include historical information describing the entity, historical financial information associated with the entity, historical segment information associated with the entity, a historical analyst rating of the entity, historical pension information associated with the entity, a historical share price of a stock associated with the entity, a historical dividend yield of the stock associated with the entity, a historical total return to shareholders of the stock associated with the entity, historical equity information associated with the entity, historical revenue of the entity, historical earnings before interest and taxes of the entity, historical revenue, costs, assets, and/or liabilities of the entity, and/or the like.

In some implementations, the current competitor information may include current information describing the competitors of the entity (e.g., describing products created by the competitors, services offered by the competitors, quantities of employees, and/or the like); current financial information associated with the competitors (e.g., information indicating financial activities and conditions of the competitors, income statements of the competitors, balance sheets of the competitors, statements of retained earnings of the competitors, statements of cash flows of the competitors, notes to financial statements, data collected from proxy filings and other statutory filings, and/or the like); current segment information associated with the competitors (e.g., information indicating geographic segments and/or business segments of the competitors); current analyst ratings of the competitors (e.g., ratings indicating whether to buy, hold, or sell stocks associated with the competitors, ratings indicating whether the competitors are underperforming or overperforming, and/or the like); current pension information associated with the competitors (e.g., information identifying pension plan assets, pension plan expenses, pension benefit obligations, and/or the like); current share prices of stocks associated with the competitors; current dividend yields of the stocks associated with the competitors; current total returns to shareholders of the stocks associated with the competitors; current equity information associated with the competitors; current revenues of the competitors; current earnings before interest and taxes of the competitors; a latest financial stock price, number of shares, market capitalization and dividend payments, and/or the like. In some implementations, the current competitor information may be received in real time or near-real time, in that the current competitor information is received by the analytics data platform as soon as (or nearly as soon as) the current competitor information is generated.

In some implementations, the historical competitor information may include historical information describing the competitors, historical financial information associated with the competitors, historical segment information associated with the competitors, historical analyst ratings of the competitors, historical pension information associated with the competitors, historical share prices of stocks associated with the competitors, historical dividend yields of the stocks associated with the competitors, historical total returns to shareholders of the stocks associated with the competitors, historical equity information associated with the competitors, historical revenues of the competitors, historical earnings before interest and taxes of the competitors, and/or the like.

Figure 1B:
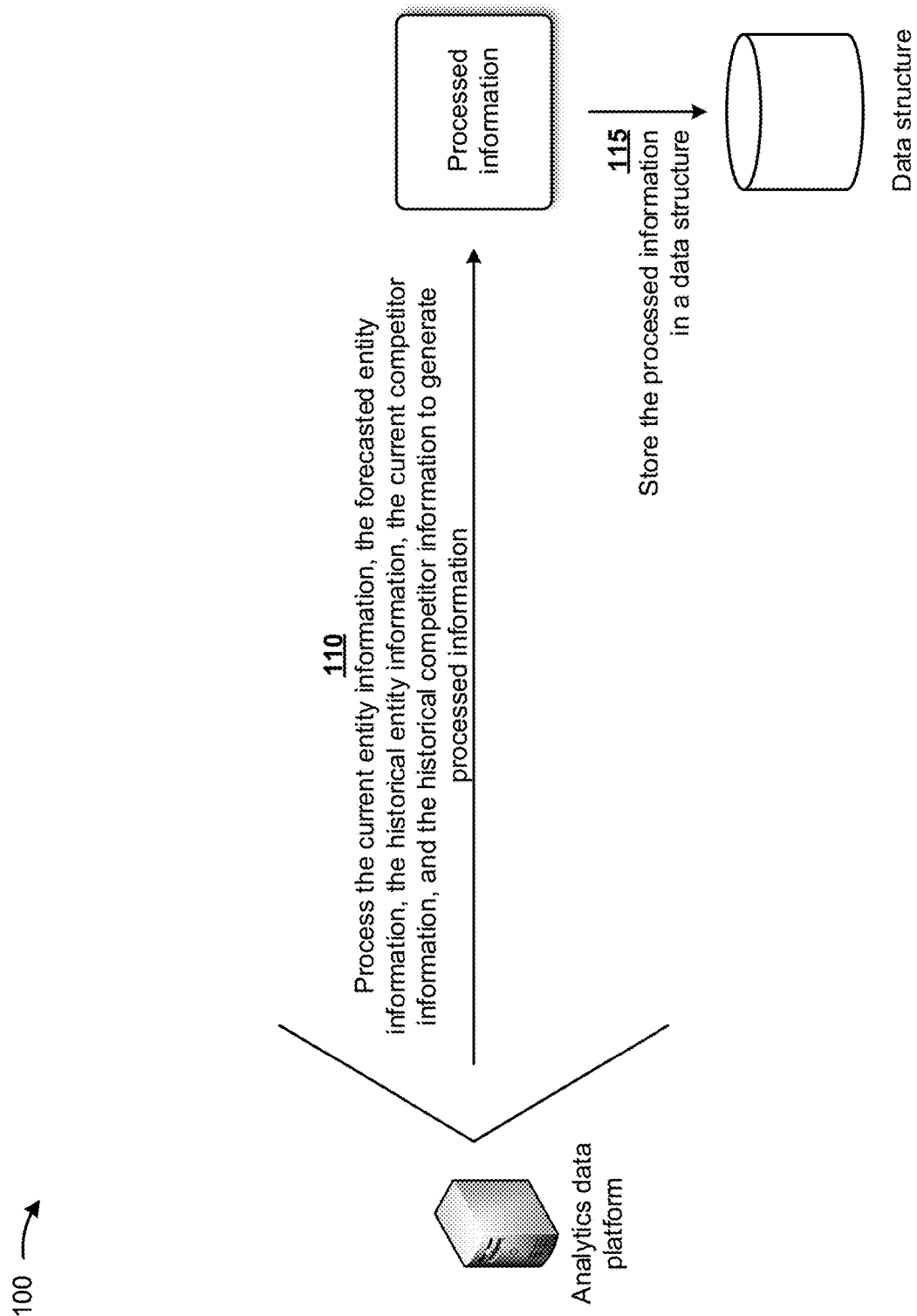

As shown in FIG. 1B, and by reference number 110, the analytics data platform may process the current entity information, the forecasted entity information, the historical entity information, the current competitor information, and/or the historical competitor information to generate processed information. In some implementations, the analytics data platform may use one or more processing techniques on the current entity information, the forecasted entity information, the historical entity information, the current competitor information, and/or the historical competitor information, to convert such information into electronic or machine-encoded information (e.g., the processed information). For example, the analytics data platform may utilize optical character recognition, speech recognition, a natural language processing technique, a computational linguistics technique, a text analysis technique, a data normalization method, a data cleansing method, and/or the like, to process the current entity information, the forecasted entity information, the historical entity information, the current competitor information, and/or the historical competitor information, to generate the processed information.

In some implementations, the analytics data platform may utilize optical character recognition (OCR) with the current entity information, the forecasted entity information, the historical entity information, the current competitor information, and/or the historical competitor information in order to convert the information into electronic information. Optical character recognition involves a conversion of images of typed, handwritten, or printed text into machine-encoded text. For example, OCR may be applied to a scanned document, a photo of a document, a photo of a scene that includes text, and/or the like, to produce electronic data (e.g., text data). OCR can be used as a form of information entry from printed paper data records (e.g., printed forms, printed tables, printed reports, passport documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like.

In some implementations, the analytics data platform may utilize speech recognition with the current entity information, the forecasted entity information, the historical entity information, the current competitor information, and/or the historical competitor information in order to convert audio-based information into text-based information. Speech recognition, which may also be known as automatic speech recognition (ASR), computer speech recognition, or speech to text (STT), involves recognizing (e.g., by a computer system) spoken language and translating the spoken language into text. For example, speech recognition may include converting audio data representing recorded language, words, or sentences, to text data representing the recorded language, words, or sentences.

In some implementations, the analytics data platform may utilize a natural language processing technique, a computational linguistics technique, a text analysis technique, and/or the like, with the current entity information, the forecasted entity information, the historical entity information, the current competitor information, and/or the historical competitor information in order to make the current entity information, the forecasted entity information, the historical entity information, the current competitor information, and/or the historical competitor information (e.g., the processed information) analyzable. For example, the analytics data platform may apply natural language processing to interpret the current entity information, the forecasted entity information, the historical entity information, the current competitor information, and/or the historical competitor information and generate additional information associated with the potential meaning of information within the current entity information, the forecasted entity information, the historical entity information, the current competitor information, and/or the historical competitor information. Natural language processing involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

In some implementations, the analytics data platform may utilize a data normalization method to process the current entity information, the forecasted entity information, the historical entity information, the current competitor information, and/or the historical competitor information and to eliminate and/or reduce redundant data from the current entity information, the forecasted entity information, the historical entity information, the current competitor information, and/or the historical competitor information. The data normalization method may include identifying values or portions of data that are repeated unnecessarily in a file, data structure, and/or the like (e.g., in records or fields, within a table, and/or the like), eliminating such values or portions of data from the file, data structure, and/or the like, converting such values or portions of data from a differing and/or nonstandard format to a same and/or standard format, and/or the like. For example, the data normalization method may include database normalization, such as may be applied to a relational database to organize columns (attributes) and tables (relations) of a relational database to reduce data redundancy and improve data integrity. Database normalization may involve arranging attributes in relations based on dependencies between attributes, ensuring that the dependencies are properly enforced by database integrity constraints. Normalization may be accomplished by applying formal rules either by a process of synthesis (e.g., creating a normalized database design based on a known set of dependencies) or decomposition (e.g., improving an existing (insufficiently normalized) database design based on the known set of dependencies).

In some implementations, the analytics data platform may utilize a data cleansing method to process the current entity information, the forecasted entity information, the historical entity information, the current competitor information, and/or the historical competitor information and to detect and/or correct corrupt or inaccurate data from the current entity information, the forecasted entity information, the historical entity information, the current competitor information, and/or the historical competitor information. The data cleansing method may include detecting and correcting (or removing) corrupt or inaccurate data (e.g., records from a record set, table, or database), and then replacing, modifying, or deleting the corrupt or inaccurate data. The data cleansing method may detect and correct inconsistencies originally caused by user entry errors, by corruption in transmission or storage, or by utilization of different definitions for similar data in different data stores. The data cleansing method may include removing typographical errors or validating and correcting values against a known list of entities. In this case, validation may be strict (e.g., rejecting any address that does not have a valid postal code) or fuzzy (e.g., correcting records that partially match existing, known records). The data cleansing method may also include cleaning data by cross checking the data with a validated data set, standardizing the data by changing a reference data set to a new standard (e.g., use of standard codes), and/or the like. Additionally, the data cleansing method may include data enhancement, where data is made more complete by adding related information (e.g., estimating values of missing current assets, liabilities, operating leases, etc.). The data cleansing method may also involve activities, such as harmonization of data (e.g., harmonization of short codes, such as "Co." to actual words such as "Company").

In this way, the analytics data platform may process the current entity information, the forecasted entity information, the historical entity information, the current competitor information, and/or the historical competitor information to generate the processed information.

As further shown in FIG. 1B, and by reference number 115, the analytics data platform may store the processed information in a data structure (e.g., a database, a table, a list, and/or the like) associated with the analytics data platform. In some implementations, the analytics data platform may store the processed information in an appropriately secure manner reflective of the type of information (e.g., via encryption and anonymization techniques).

Figure 1C:
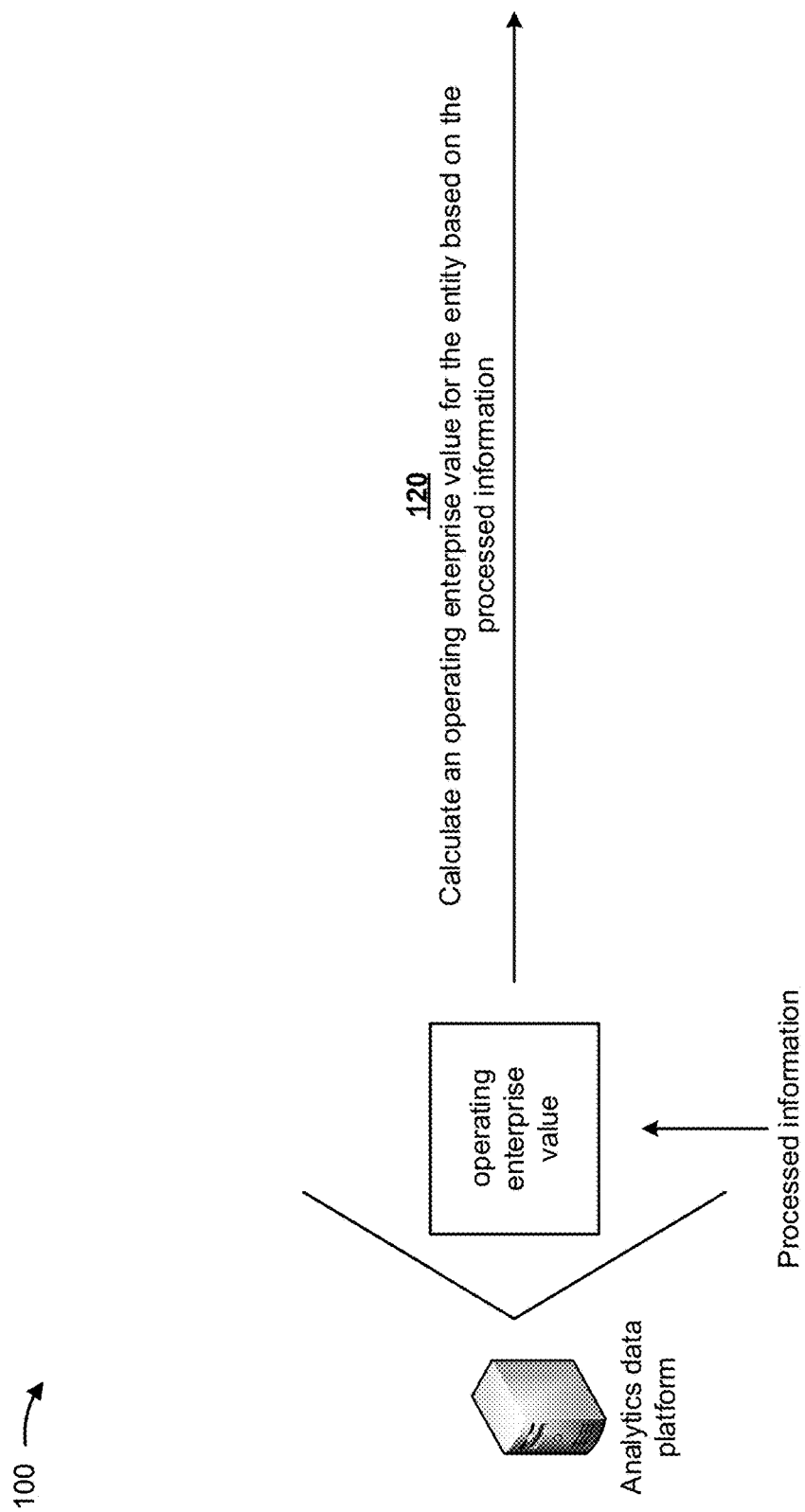

As shown in FIG. 1C, and by reference number 120, the analytics data platform may calculate an operating enterprise value (EV) for the entity based on the processed information. In some implementations, the analytics data platform may classify revenue, costs, assets, and/or liabilities of the entity (e.g., as indicated in the processed information) into an operating asset class and a non-operating asset class. In some implementations, the analytics data platform may determine market values for the operating asset class and the non-operating asset class based on stock valuation of a stock associated with the entity. For example, the analytics data platform may triangulate (e.g., combine and apply weights to) the market values for the operating asset class and the non-operating asset class based on the stock valuation and industry multiples (e.g., techniques that demonstrate what a business is worth, such as enterprise value (EV) to gross revenues or net sales, EV to net operating profit after tax (NOPAT), EV to discretionary cash flow, EV to total business assets, and/or the like). In some implementations, the analytics data platform may calculate the operating enterprise value for the entity based on determining the market values for the operating asset class and the non-operating asset class.

In some implementations, the analytics data platform may calculate a net operating profit less adjusted taxes (NOPLAT) for the entity based on the processed information in a similar manner as described above for the operating enterprise value of the entity.

Figure 1D:
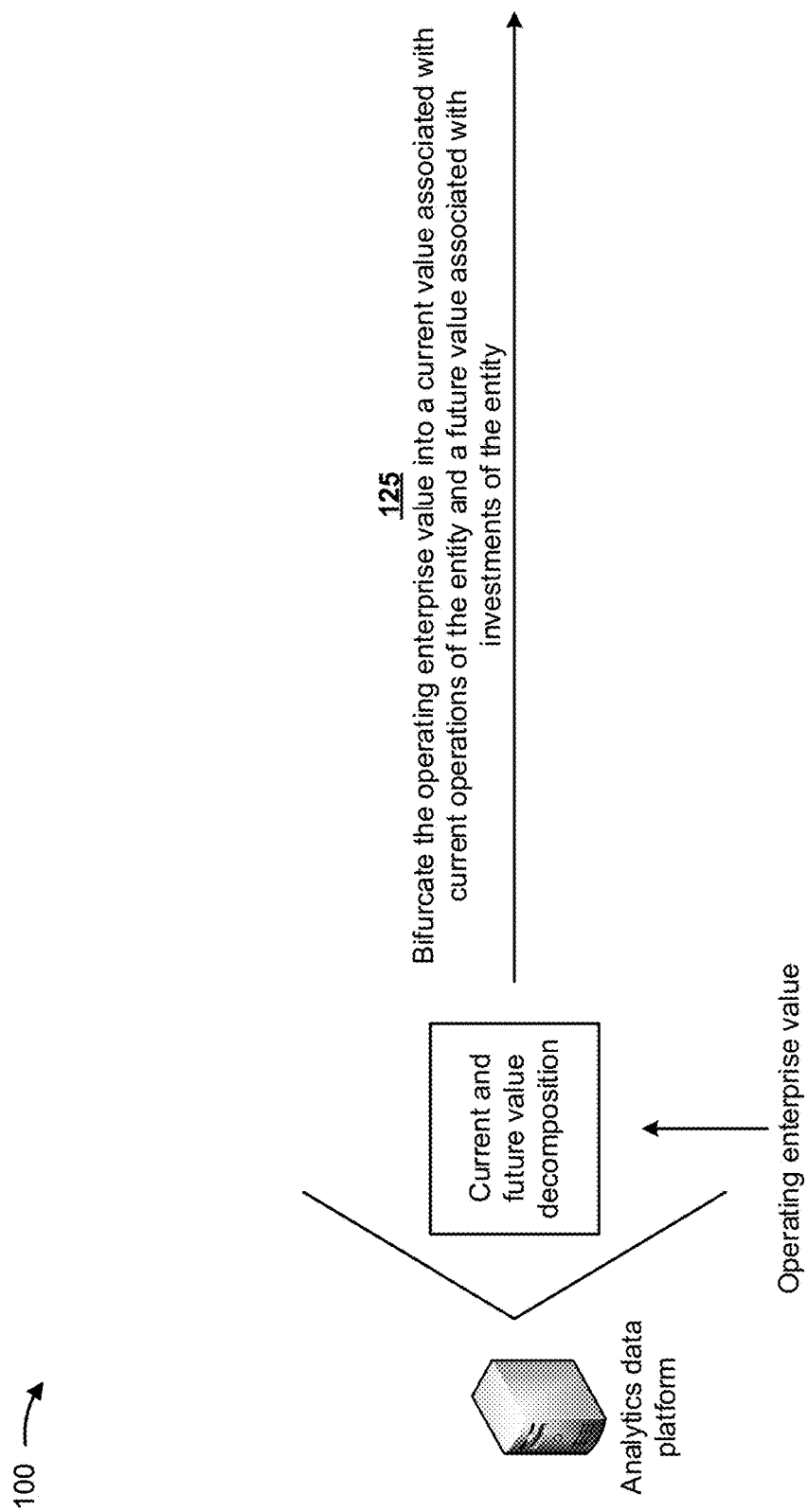

As shown in FIG. 1D, and by reference number 125, the analytics data platform may bifurcate (e.g., divide) the operating enterprise value into a current value associated with current operations of the entity and a future value associated with investments of the entity. In some implementations, the analytics data platform may identify portions of the operating enterprise value that are attributable to the current operations of the entity, and may identify portions of the operating enterprise value that are attributable to the investments of the entity. The analytics data platform may allocate, to the current value, the portions of the operating enterprise value that are attributable to the current operations of the entity, and may allocate, to the future value, the portions of the operating enterprise value that are attributable to the investments of the entity.

In some implementations, the current value and the future value may be calculated based on a weighted average cost of capital (WACC) (e.g., a rate that the entity is expected to pay on average to security holders for financing assets) and a tax rate sensitivity for the entity. The WACC may provide an indication of the entity's cost of capital and is dictated by the external market and not by the entity. In some implementations, the current value and the future value may provide analytics data into a value that investors are attributing to the entity's existing operations and a value that investors are attributing to expected free cash flow growth from operating performance of the entity. In some implementations, the current value and the future value may provide analytics data into investor expectations that are not directly observable from a stock price of the entity.

Figure 1E:
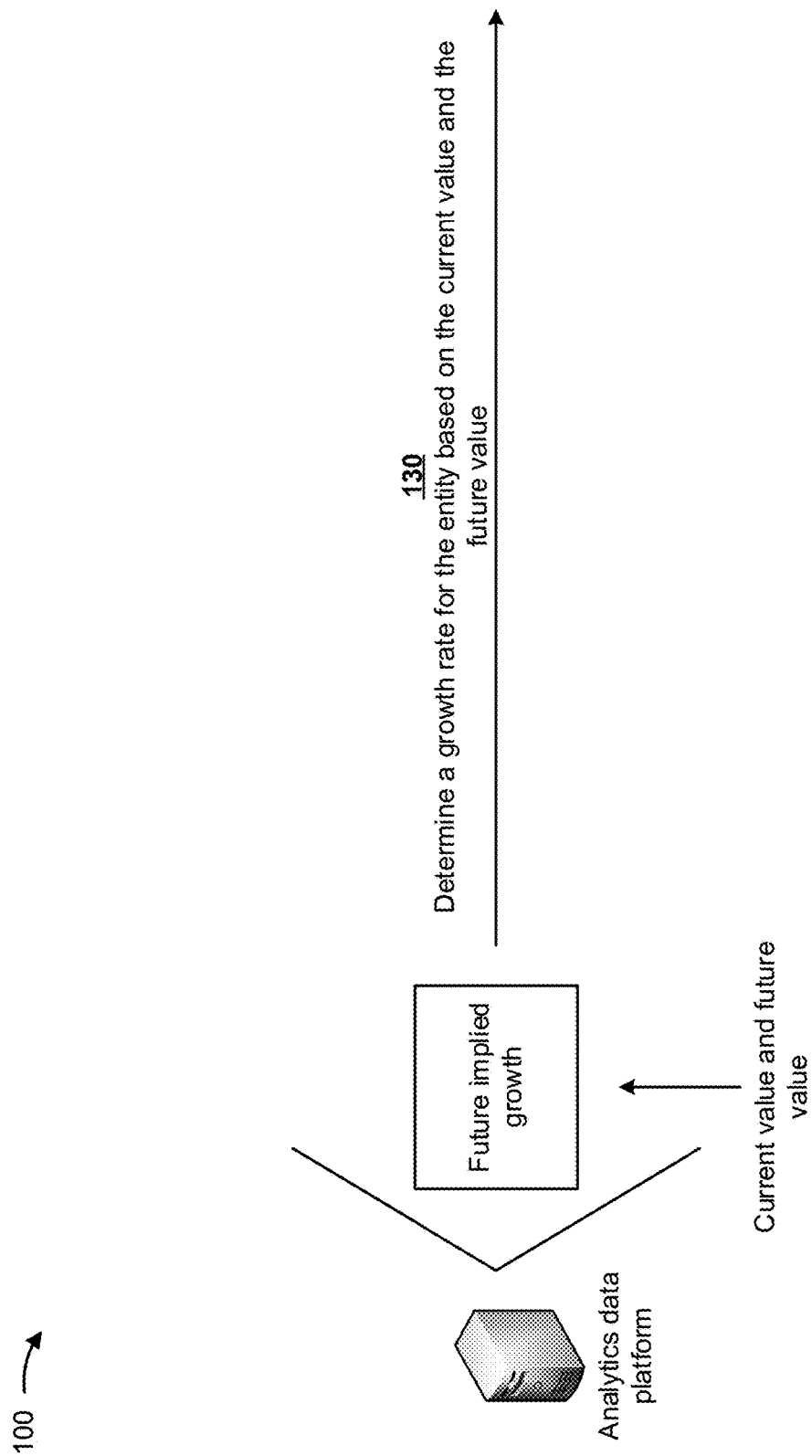

As shown in FIG. 1E, and by reference number 130, the analytics data platform may determine a growth rate for the entity based on the current value and the future value. In some implementations, the analytics data platform may calculate, based on the current value and the future value, a short-term future cash flow (FCF) implied growth rate for the entity (e.g., relative to a mid-term FCF implied growth rate and/or a long-term FCF implied growth rate), a mid-term FCF implied growth rate for the entity (e.g., relative to the short-term FCF implied growth rate and/or the long-term FCF implied growth rate), a long-term FCF implied growth rate for the entity (e.g., relative to the short-term FCF implied growth rate and/or the mid-term FCF implied growth rate), and/or the like. In some implementations, the short-term FCF implied growth rate may be relative to a first time period threshold, the mid-term FCF implied growth rate may be relative to a second time period threshold that is greater than the first time period threshold, the long-term FCF implied growth rate may be relative to a third time period threshold that is greater than the second time period threshold, and/or the like. In some implementations, the analytics data platform may calculate an FCF for the entity (e.g., based on a cash flow statement of the entity) by subtracting capital expenditure required for current operations of the entity from cash flow from operations (e.g., operating cash or net cash from operating activities) of the entity.

In some implementations, the growth rate for the entity may provide an indication of a WACC and a tax rate sensitivity for the entity. In some implementations, the growth rate for the entity may provide an indication of historic FCF performance, with investor growth expectation, of the entity, an estimated growth required for the entity over different horizons to meet current investor expectation, and/or the like.

Figure 1F:
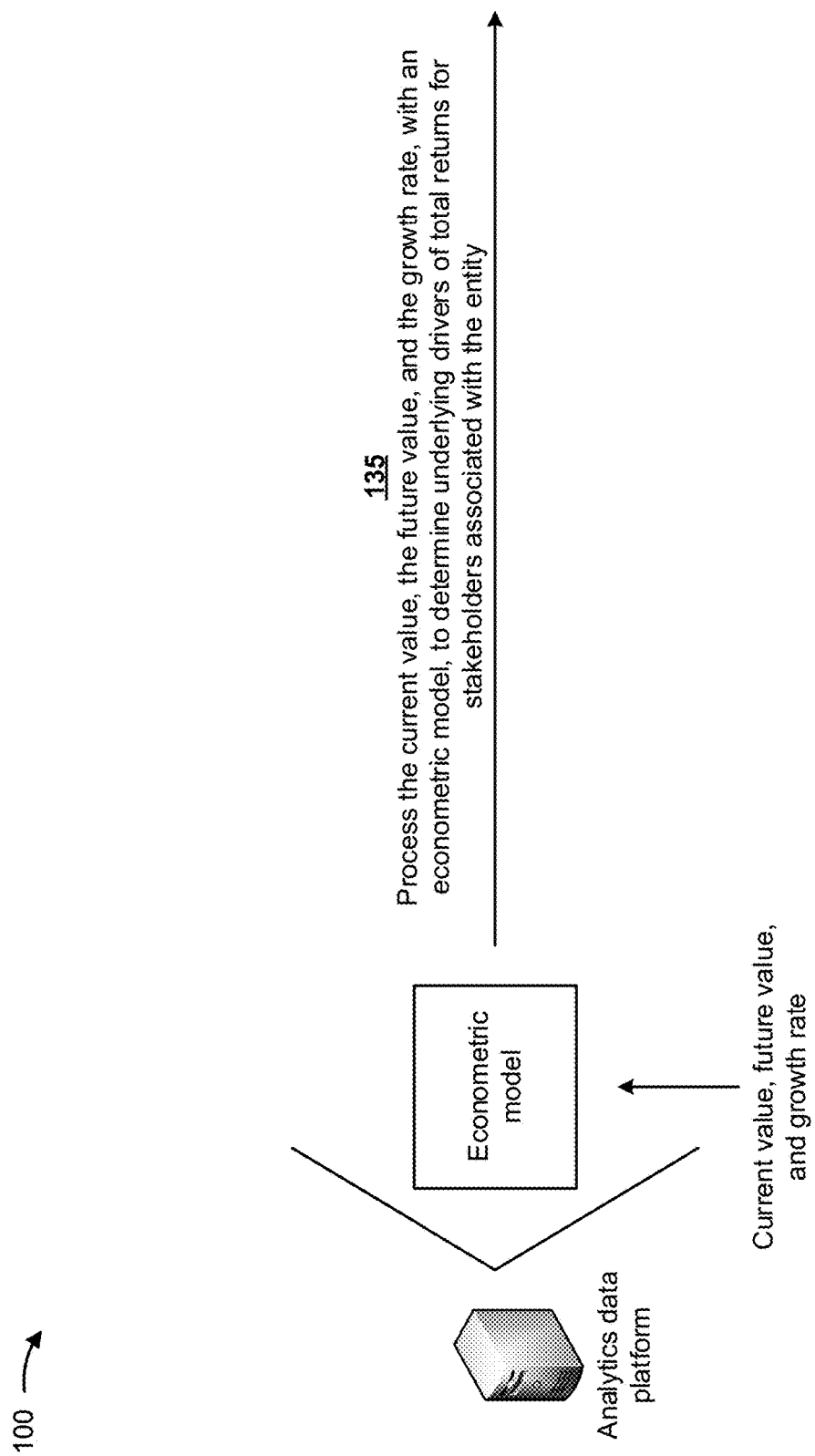

As shown in FIG. 1F, and by reference number 135, the analytics data platform may process the current value, the future value, and the growth rate, with an econometric model, to determine underlying drivers of total returns for stakeholders associated with the entity. In some implementations, the econometric model may include a model that applies differential calculus to the current value, the future value, and the growth rate to determine drivers that impact the underlying drivers of total returns for stakeholders. In some implementations, the drivers may include revenue of the entity, margins associated with the entity, investor expectations of the entity, dividends of the entity, capital structure decisions of the entity, and/or the like.

In some implementations, the econometric model may determine a correlation of each driver to the other drivers and may determine the underlying drivers of total returns for stakeholders associated with the entity based on the determined correlations. In some implementations, the analytics data platform may process the current value, the future value, and the growth rate, with the econometric model, to determine information associated with revenue, margins, investor expectations, dividends, capital structure decisions, and/or the like of the entity, and may determine the underlying drivers of total returns for stakeholders associated with the entity based on the information associated with the revenue, the margins, the investor expectations, the dividends, the capital structure decisions, and/or the like of the entity.

Figure 1G:
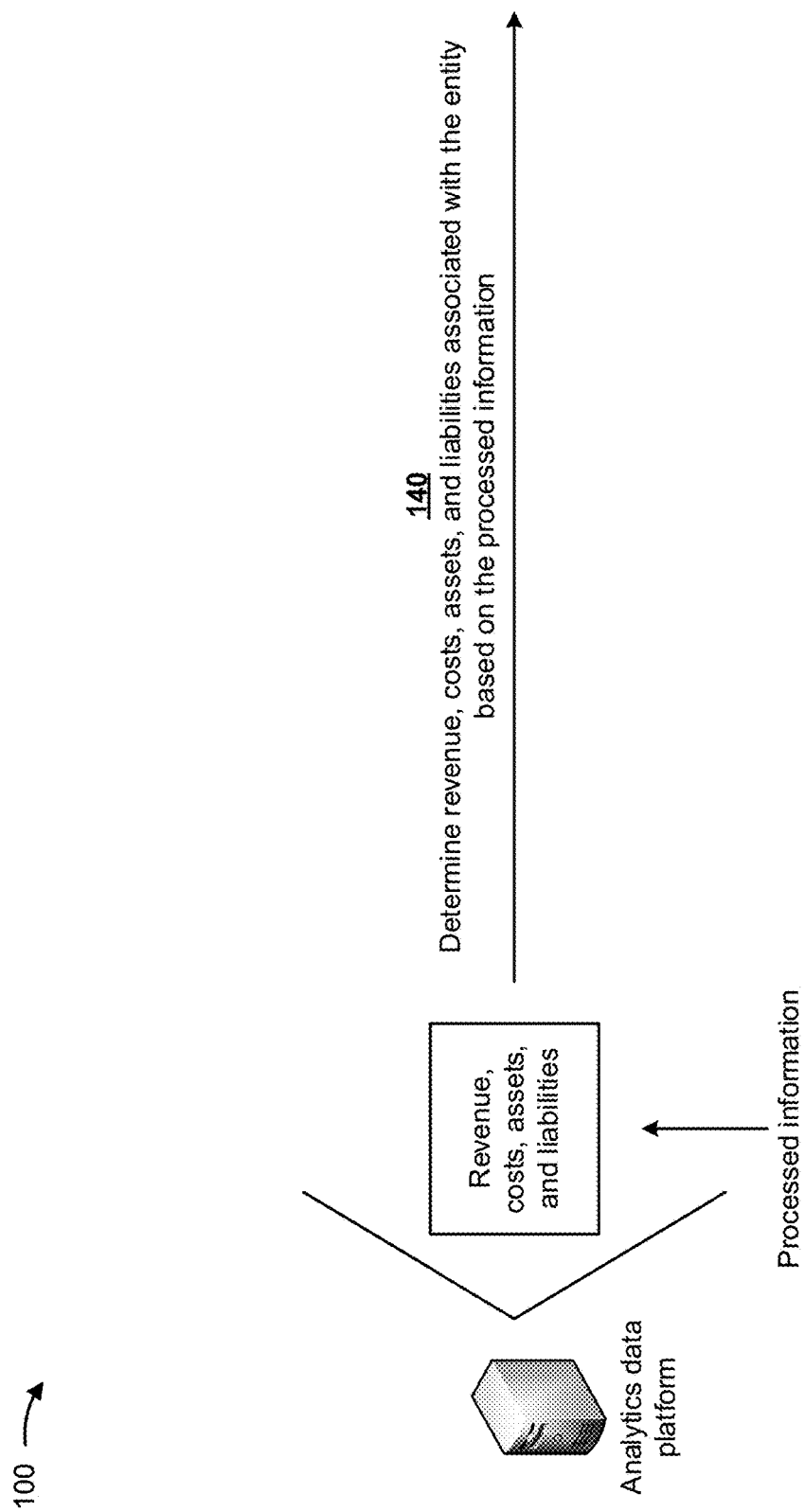

As shown in FIG. 1G, and by reference number 140, the analytics data platform may determine revenue, costs, assets, and liabilities associated with the entity based on the processed information. In some implementations, the revenue associated with the entity may include income received from operations, investments, business activities (e.g., sale of goods and services), interest, royalties, fees, and/or the like. In some implementations, the costs associated with the entity may include a cost of debt associated with the entity, costs associated with leases of assets by the entity, operating costs of the entity, depreciation costs of the entity, salaries, and/or the like. In some implementations, the assets associated with the entity may include tangible assets (e.g., inventory, buildings, equipment, etc.), intangible assets (e.g., goodwill, copyrights, trademarks, patents, computer programs, bonds, stocks, etc.), and/or the like. In some implementations, the liabilities of the entity may include legal liabilities of the entity, liabilities associated with pensions of the entity, liabilities associated with medical coverage provided by the entity, and/or the like. In some implementations, the analytics data may adjust the underlying drivers of total returns for stakeholders based on the revenue, costs, assets, and liabilities associated with the entity in order to provide an indication of a true value of investments in the entity.

Figure 1H:
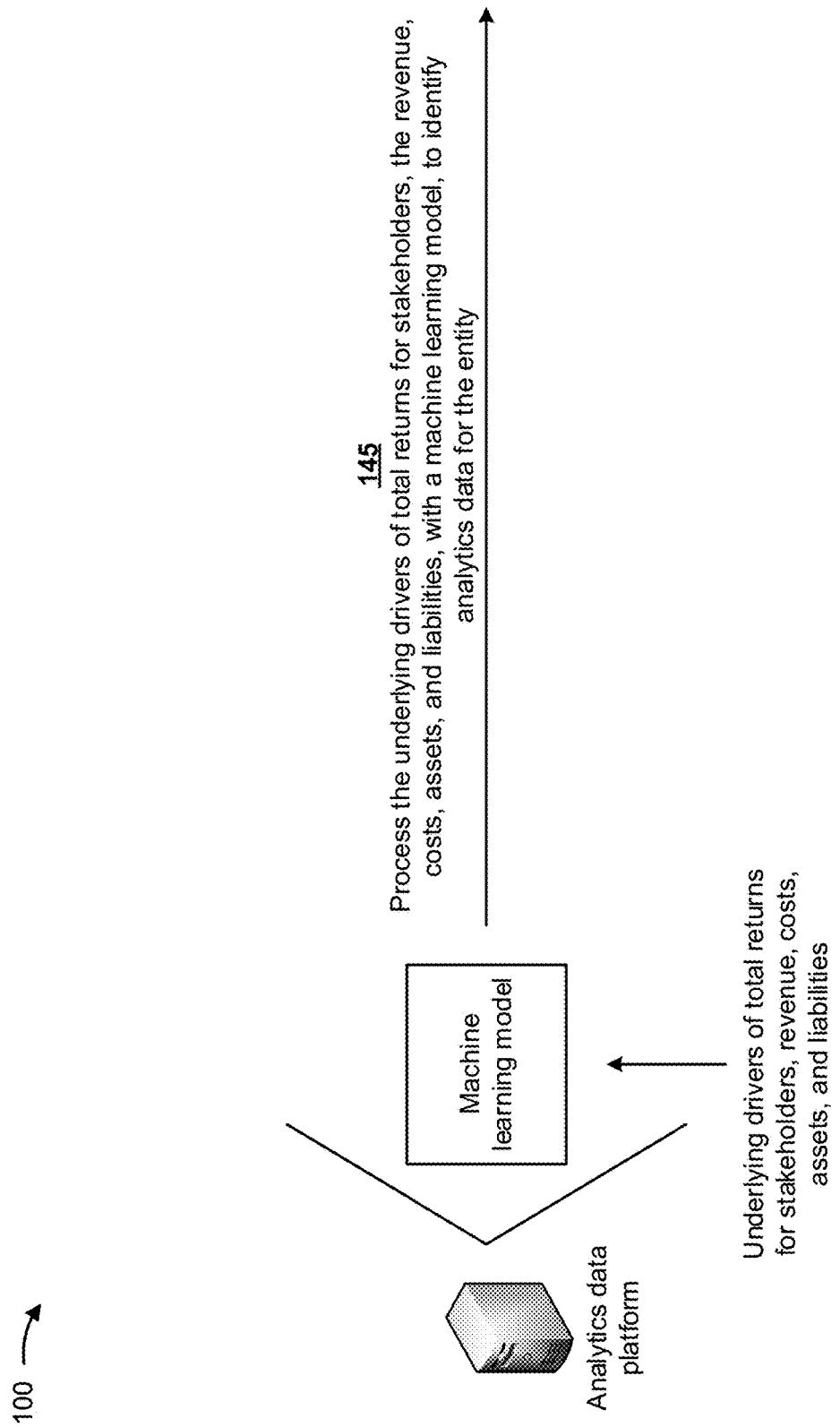

As shown in FIG. 1H, and by reference number 145, the analytics data platform may process the underlying drivers of total returns for stakeholders, the revenue, the costs, the assets, and the liabilities, with a machine learning model, to identify analytics data for the entity. In some implementations, the machine learning model may include a neural network model, a deep learning model, a clustering model, a classification model, a numerical regression model, and/or the like.

In some implementations, the analytics data platform may perform a training operation on the machine learning model with historical information (e.g., historical underlying drivers of total returns for stakeholders, revenue, costs, assets, and/or liabilities associated with entities). For example, the analytics data platform may separate the historical information into a training set, a validation set, a test set, and/or the like. In some implementations, the analytics data platform may train the machine learning model using, for example, an unsupervised training procedure and based on the training set of the configuration and historical information. For example, the analytics data platform may perform dimensionality reduction to reduce the historical information to a minimum feature set, thereby reducing resources (e.g., processing resources, memory resources, and/or the like) to train the machine learning model, and may apply a classification technique, to the minimum feature set.

In some implementations, the analytics data platform may use a logistic regression classification technique to determine a categorical outcome (e.g., that the historical information indicates particular analytics data associated with the entities). Additionally, or alternatively, the analytics data platform may use a naïve Bayesian classifier technique. In this case, the analytics data platform may perform binary recursive partitioning to split the configuration and historical information into partitions and/or branches and use the partitions and/or branches to perform predictions (e.g., that the historical information indicates particular analytics data associated with the entities). Based on using recursive partitioning, the analytics data platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the analytics data platform may use a support vector machine (SVM) classifier technique to generate a non-linear boundary between data points in the training set. In this case, the non-linear boundary is used to classify test data into a particular class.

Additionally, or alternatively, the analytics data platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the analytics data platform may use one or more other model training techniques, such as a neural network technique, a latent semantic indexing technique, and/or the like. For example, the analytics data platform may perform an artificial neural network processing technique (e.g., using a two-layer feedforward neural network architecture, a three-layer feedforward neural network architecture, and/or the like) to perform pattern recognition with regard to particular analytics data indicated in the historical information. In this case, using the artificial neural network processing technique may improve an accuracy of the trained machine learning model generated by the analytics data platform by being more robust to noisy, imprecise, or incomplete data, and by enabling the analytics data platform to detect patterns and/or trends undetectable to human analysts or systems using less complex techniques.

Figure 1I:
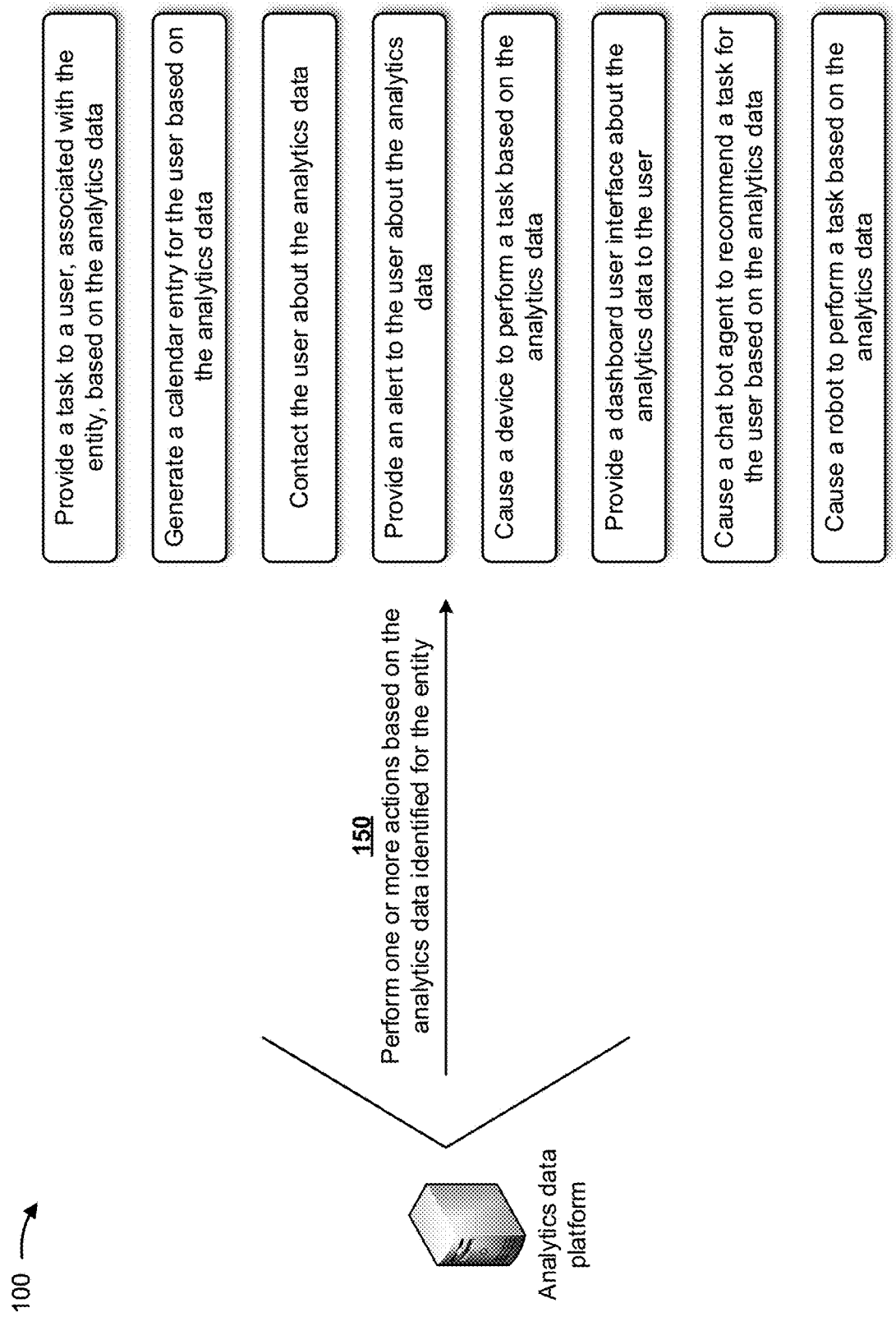

As shown in FIG. 1I, and by reference number 150, the analytics data platform may automatically perform one or more actions based on the analytics data identified for the entity. In some implementations, the one or more actions may include providing a task to a client device of a user, associated with the entity, based on analytics data. For example, the analytics data platform may provide a task instructing the user to purchase an asset that will increase the underlying drivers of total returns for stakeholders. In this way, the analytics data platform may provide tasks to users that increase the underlying drivers of total returns for stakeholders.

In some implementations, the one or more actions may include generating a calendar entry (e.g., for a calendar of the user) for the client device of the user based on analytics data. For example, the analytics data platform may add a calendar entry indicating that the user is to attend a meeting to discuss activities that affect the underlying drivers of total returns for stakeholders. In this way, the analytics data platform may ensure that users discuss such activities at appropriate times.

In some implementations, the one or more actions may include contacting the client devices of the user about analytics data. For example, the analytics data platform may contact (e.g., via an email, a telephone call, a text message, and/or the like) the user if the insight indicates reasons that the underlying drivers of total returns for stakeholders are increasing. In this way, the analytics data platform may ensure that users are immediately made aware of the reasons that the underlying drivers of total returns for stakeholders are increasing.

In some implementations, the one or more actions may include providing an alert to the client device of a user about analytics data. For example, the analytics data platform may provide an alert (e.g., via an email, a telephone call, a text message, and/or the like) to the user if the insight indicates reasons that the underlying drivers of total returns for stakeholders are decreasing. In this way, the analytics data platform may ensure that users are immediately made aware of the reasons that the underlying drivers of total returns for stakeholders are decreasing.

In some implementations, the one or more actions may include causing a device to perform a task based on analytics data. For example, the analytics data platform may cause a server device of the entity to automatically undertake better hedging techniques for better input cost management. In this way, the analytics data platform may automatically cause devices to perform tasks that increase the underlying drivers of total returns for stakeholders.

In some implementations, the one or more actions may include providing a dashboard user interface about the analytics data to client devices of users associated with the entity. For example, the analytics data platform may provide a dashboard user interface indicating a competitiveness scorecard for the entity, a total return for stakeholders of the entity, a value creation potential of the entity, a target future value of the entity, a return on invested capital decomposition of the entity, and/or the like. In this way, the analytics data platform may enable the users to track analytics data for the entity on a daily basis, a weekly basis, and/or the like.

In some implementations, the one or more actions may include causing a chat bot to recommend a task for a user (e.g., via a client device) based on analytics data. For example, the analytics data platform may cause the chat bot to appear on the client device and to recommend improving research and development productivity or reduce a cost of corporate by establishing shared services. In this way, the analytics data platform may enable users to receive the analytics data from a personalized interactive chat bot.

In some implementations, the one or more actions may include causing a robot to perform a task based on analytics data. For example, the analytics data platform may cause a robot to generate one or more reports for a new capital expenditure for the entity. In this way, the analytics data platform may cause robots to perform tasks that were originally performed by individuals.

Figure 1J:
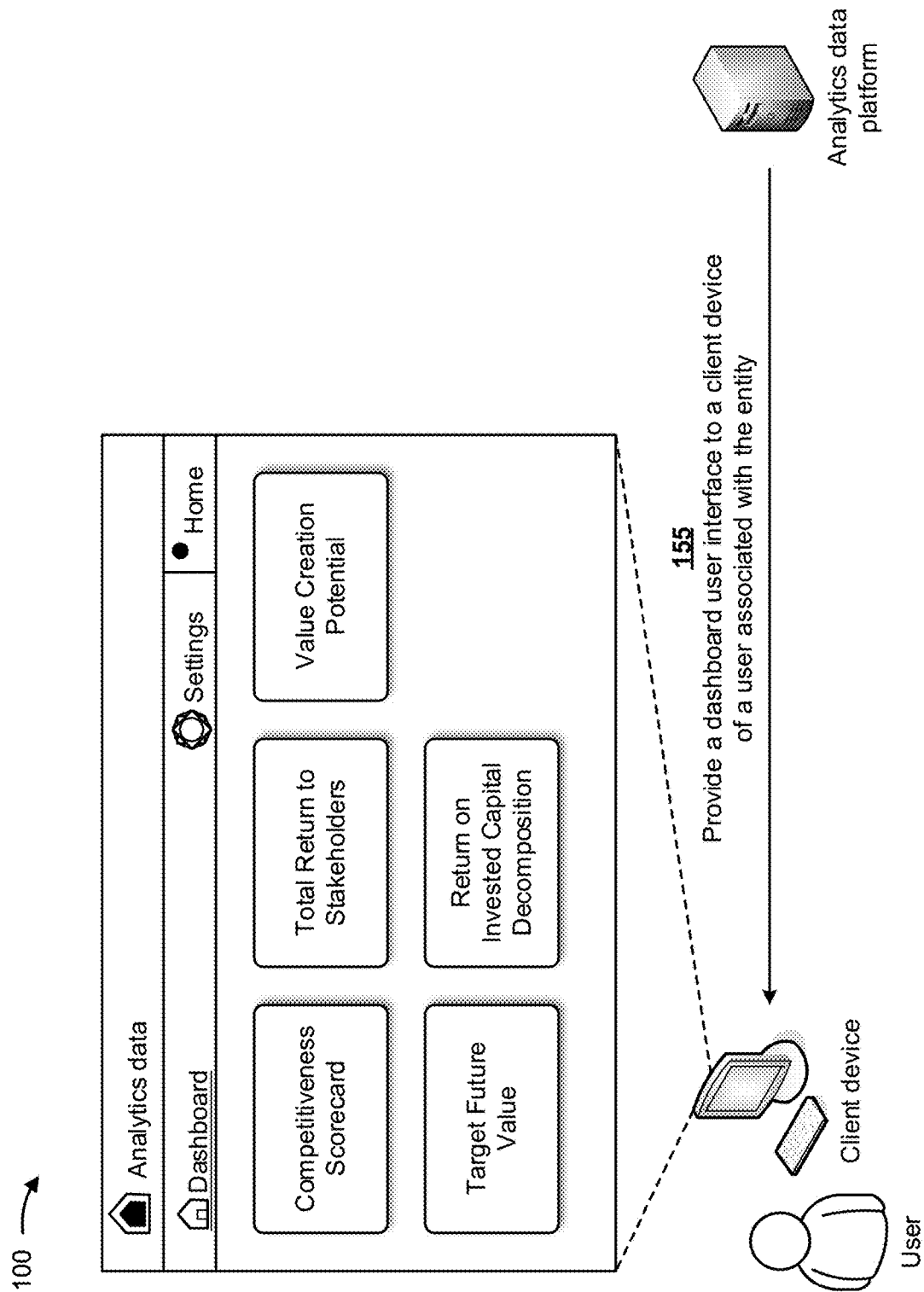

As shown in FIG. 1J, and by reference number 155, the analytics data platform may provide a dashboard user interface to a client device of a user associated with the entity. In some implementations, the client device may receive the dashboard user interface and may display the dashboard user interface to the user. In some implementations, the dashboard user interface may include information indicating a competitiveness scorecard for the entity, a total return for stakeholders of the entity, a value creation potential of the entity, a target future value of the entity, a return on invested capital decomposition of the entity, and/or the like.

As shown in FIG. 1K, and by reference number 160, the analytics data platform may provide a dashboard user interface to the client device of the user associated with the entity. In some implementations, the client device may receive the dashboard user interface and may display the dashboard user interface to the user. In some implementations, the dashboard user interface may include information indicating a competitiveness scorecard for the entity.

Figure 1L:
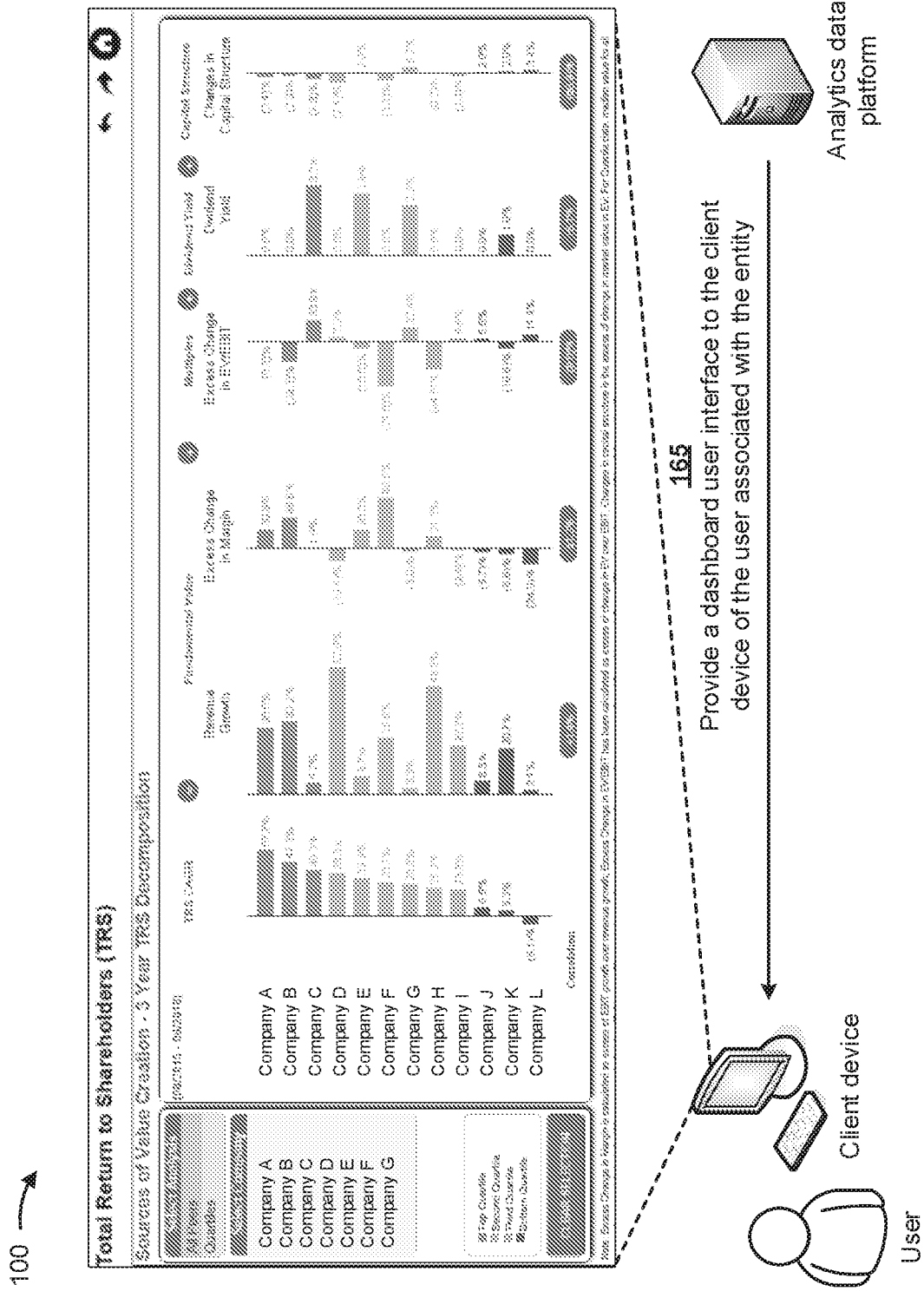

As shown in FIG. 1L, and by reference number 165, the analytics data platform may provide a dashboard user interface to the client device of the user associated with the entity. In some implementations, the client device may receive the dashboard user interface and may display the dashboard user interface to the user. In some implementations, the dashboard user interface may include information indicating a total return to shareholders for the entity.

Figure 1M:
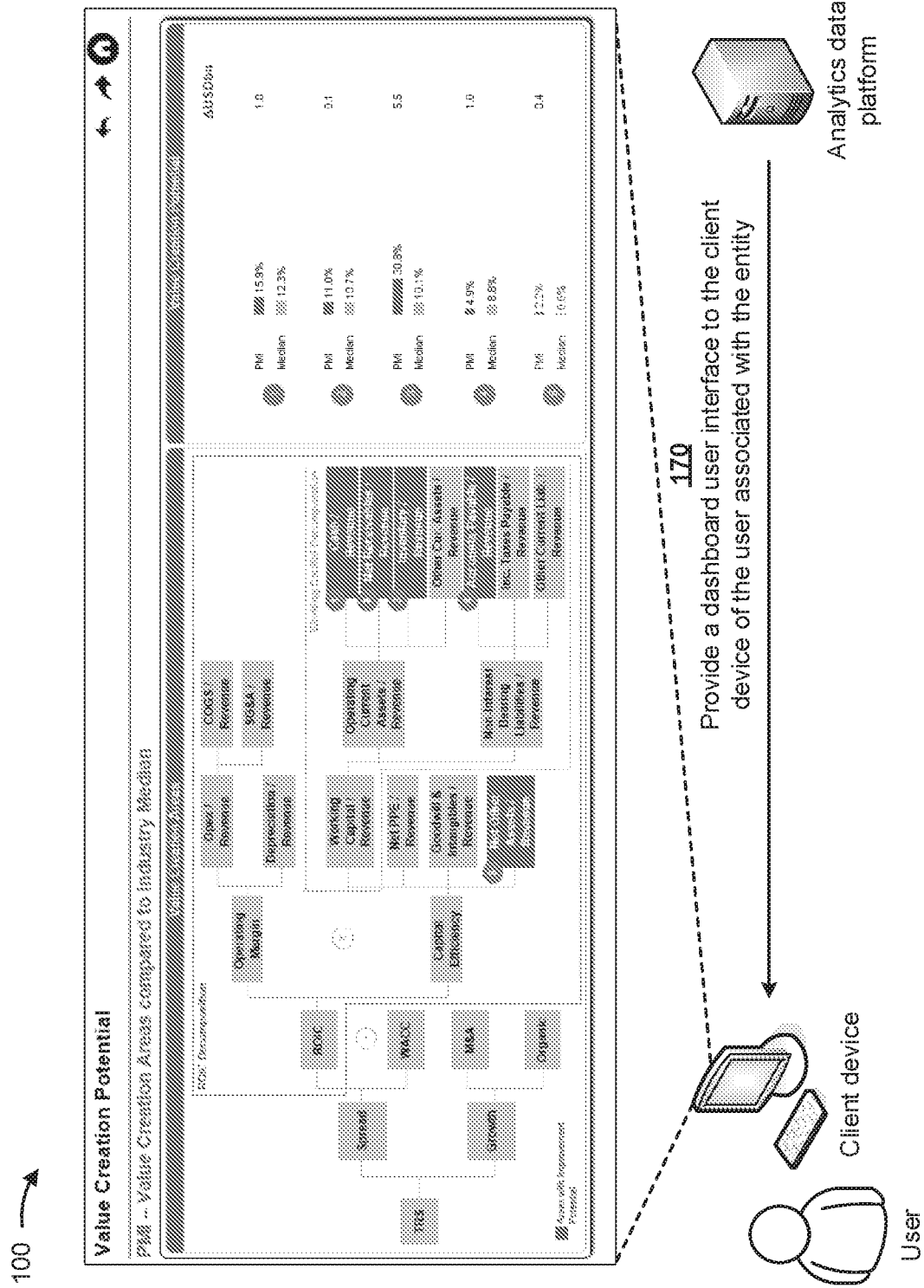

As shown in FIG. 1M, and by reference number 170, the analytics data platform may provide a dashboard user interface to the client device of the user associated with the entity. In some implementations, the client device may receive the dashboard user interface and may display the dashboard user interface to the user. In some implementations, the dashboard user interface may include information indicating a value creation potential for the entity.

Figure 1N:
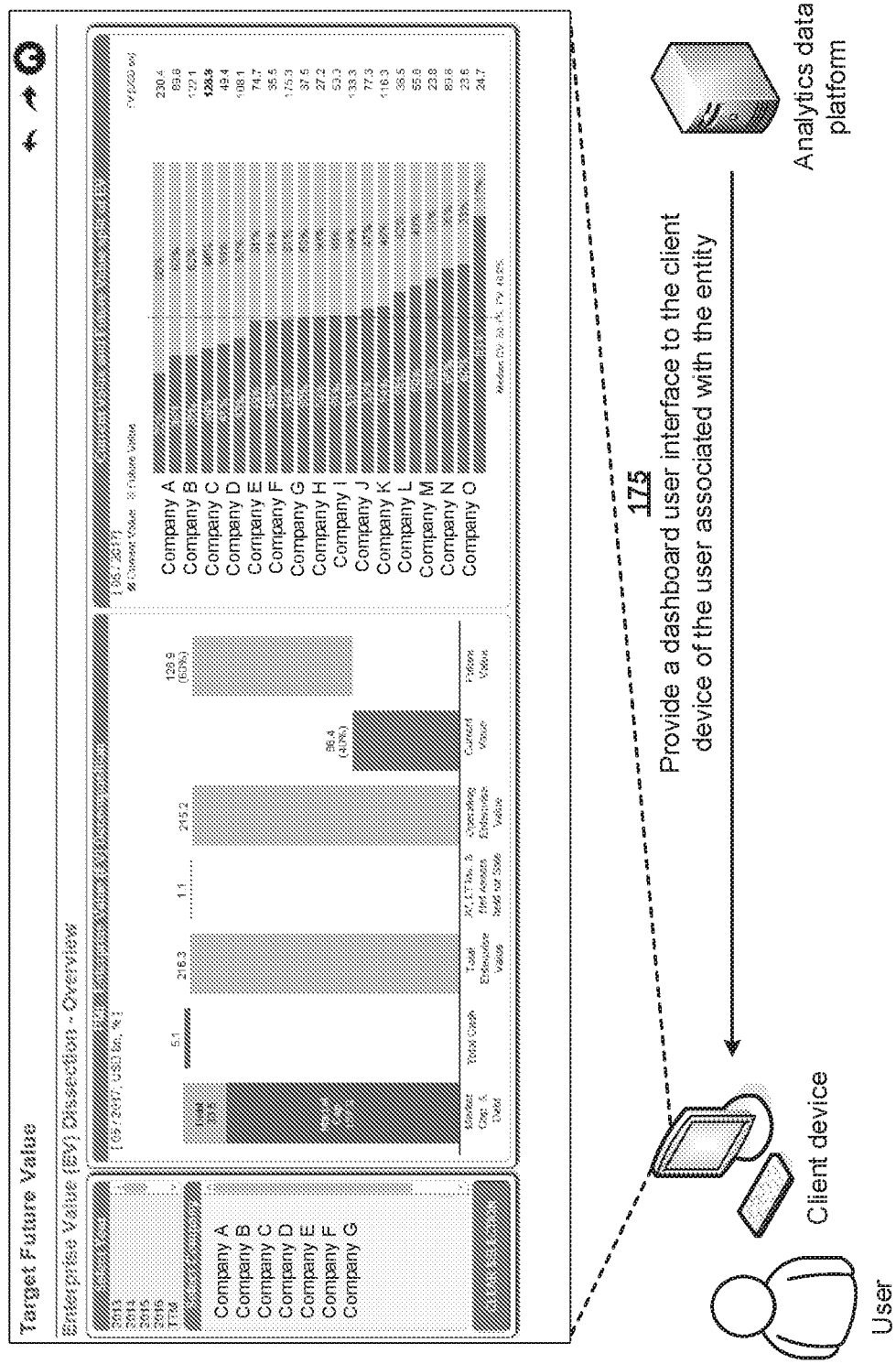
Figure 10:
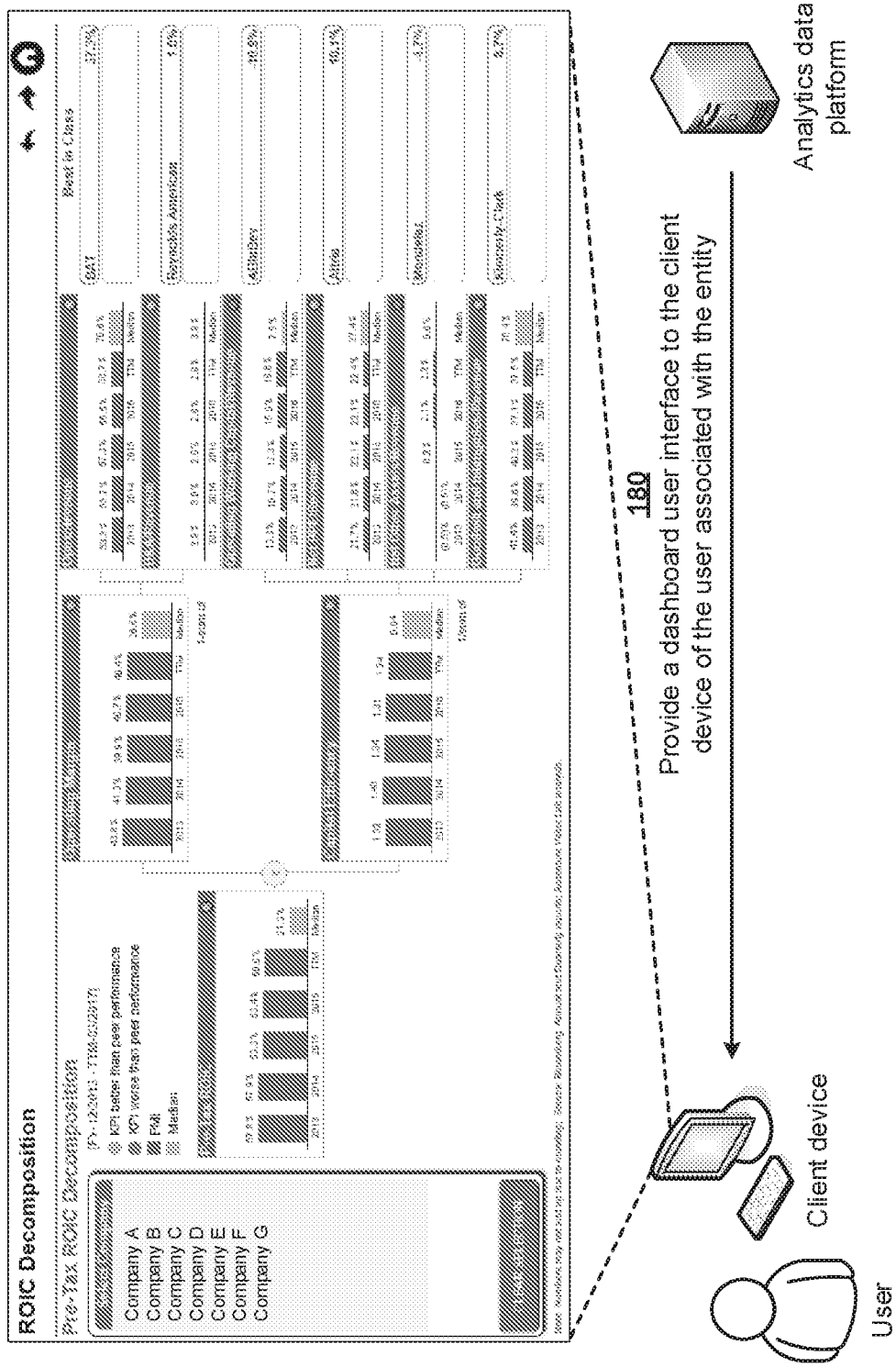

As shown in FIG. 1N, and by reference number 175, the analytics data platform may provide a dashboard user interface to the client device of the user associated with the entity. In some implementations, the client device may receive the dashboard user interface and may display the dashboard user interface to the user. In some implementations, the dashboard user interface may include information indicating a target future value for the entity.

As shown in FIG. 1O, and by reference number 180, the analytics data platform may provide a dashboard user interface to the client device of the user associated with the entity. In some implementations, the client device may receive the dashboard user interface and may display the dashboard user interface to the user. In some implementations, the dashboard user interface may include information indicating a return on invested capital (ROIC) decomposition for the entity.

In this way, several different stages of the process for identifying analytics data for an entity are automated via a machine learning model, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that utilizes econometric and machine learning models to identify analytics data for an entity. Finally, automating the process for identifying analytics data for an entity conserves computing resources (e.g., processing resources, memory resources, and/or the like) that would otherwise be wasted in attempting to collect and correlate information used to identify analytics data for an entity.

As indicated above, FIGS. 1A-1O are provided merely as examples. Other examples may differ from what was described with regard to FIGS. 1A-1O.

Figure 2:
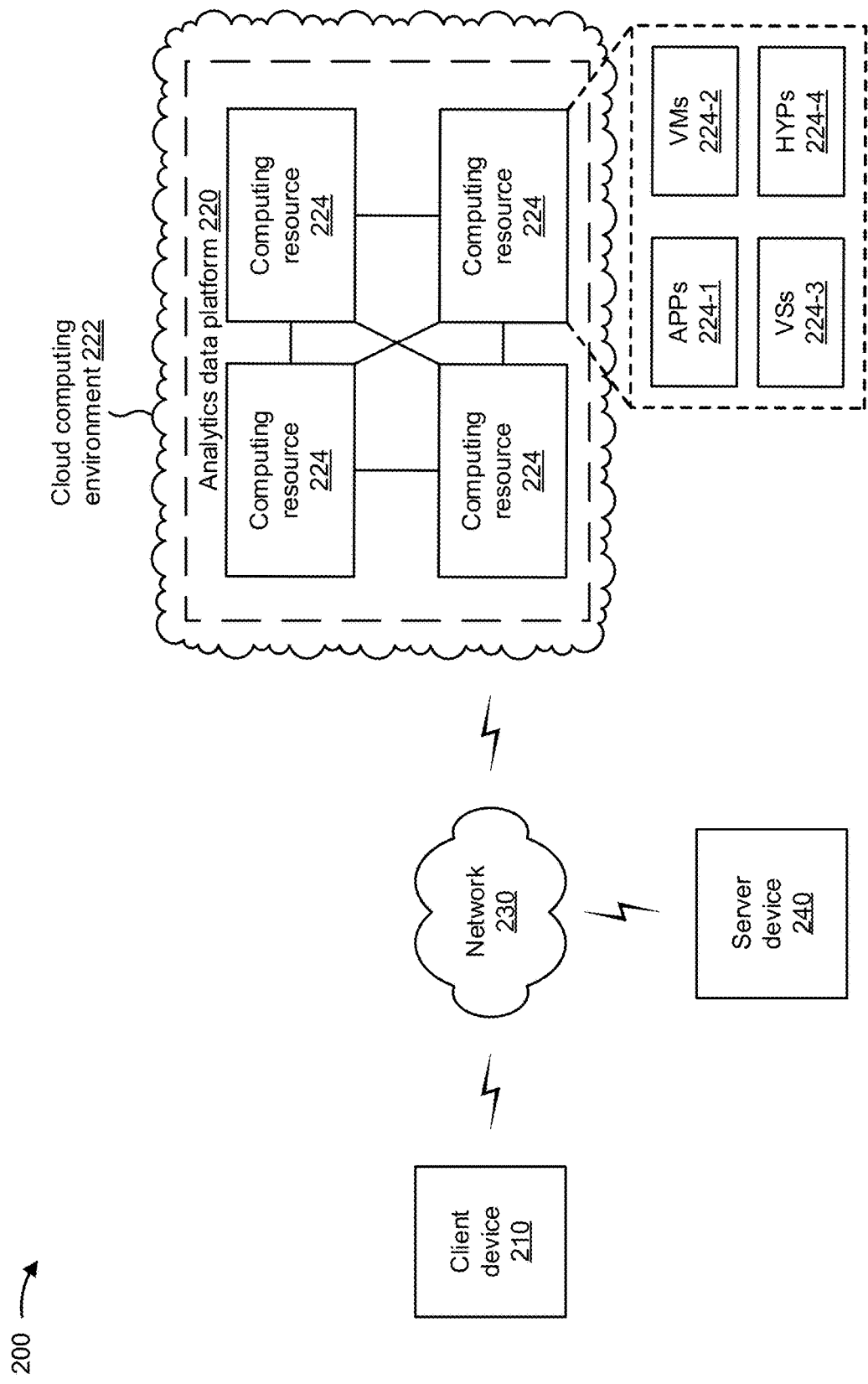
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a client device 210, analytics data platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to analytics data platform 220 and/or server device 240.

Analytics data platform 220 includes one or more devices that utilize econometric and machine learning models to identify analytics data for an entity. In some implementations, analytics data platform 220 may be designed to be modular such that certain software components may be swapped in or out depending on a particular need. As such, analytics data platform 220 may be easily and/or quickly reconfigured for different uses. In some implementations, analytics data platform 220 may receive information from and/or transmit information to one or more client devices 210 and/or server devices 240.

In some implementations, as shown, analytics data platform 220 may be hosted in a cloud computing environment 222. Notably, while implementations described herein describe analytics data platform 220 as being hosted in cloud computing environment 222, in some implementations, analytics data platform 220 may not be cloud-based (i.e., may be implemented outside of a cloud computing environment) or may be partially cloud-based.

Cloud computing environment 222 includes an environment that hosts analytics data platform 220. Cloud computing environment 222 may provide computation, software, data access, storage, etc. services that do not require end-user knowledge of a physical location and configuration of system(s) and/or device(s) that hosts analytics data platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host analytics data platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with analytics data platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 and/or server device 240 or an operator of analytics data platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a server device, a group of server devices, or a similar type of device, which provides real-time customer data and historical customer data for access by client device 210 and/or analytics data platform 220. In some implementations, server device 240 may receive information from and/or transmit information to client device 210 and/or analytics data platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
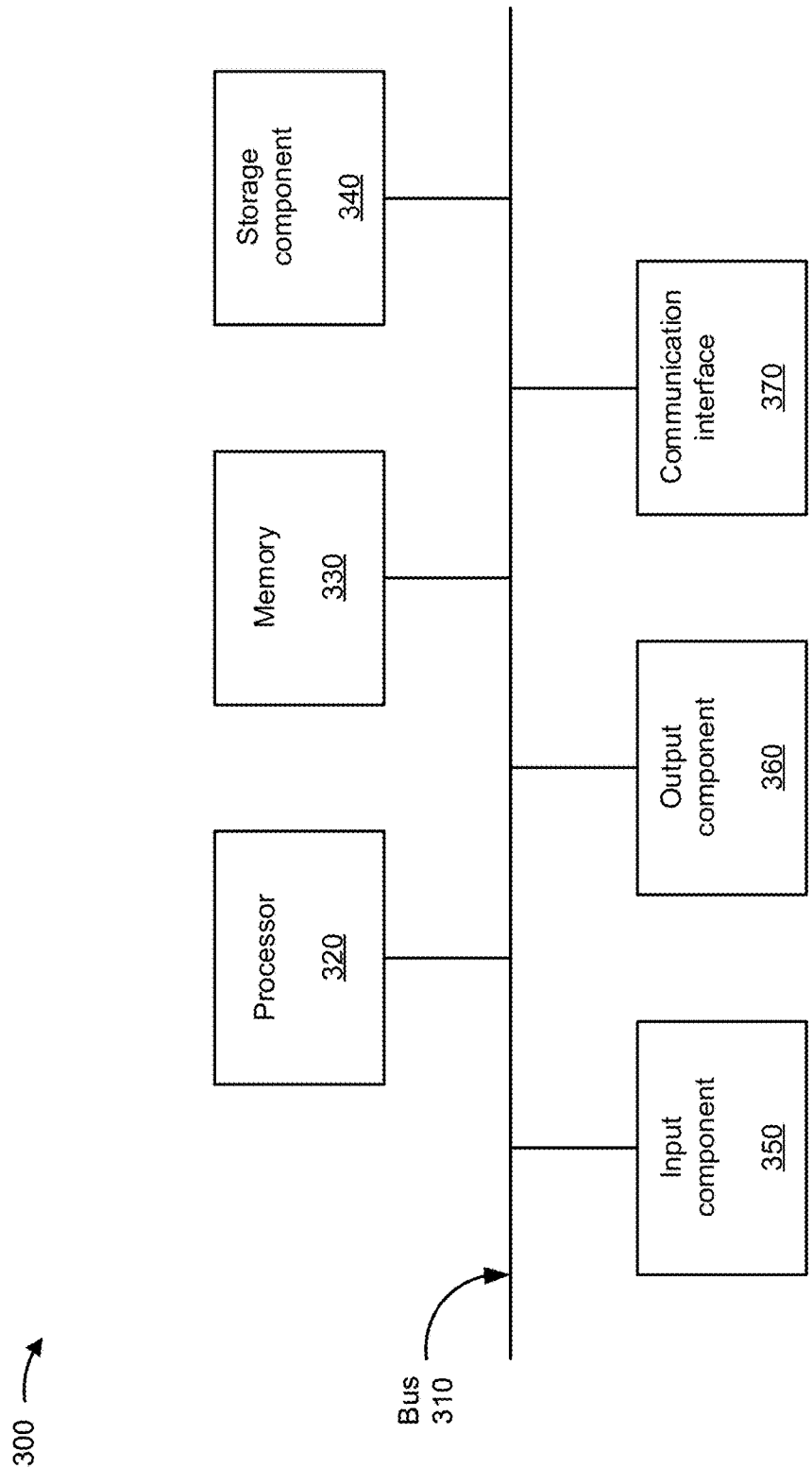
FIG. 3 is a diagram of example components of one or more devices of FIG. 2.

FIG. 3 is a diagram of example components of a device 300. Device 300 may correspond to client device 210, analytics data platform 220, and/or computing resource 224. In some implementations, client device 210, analytics data platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
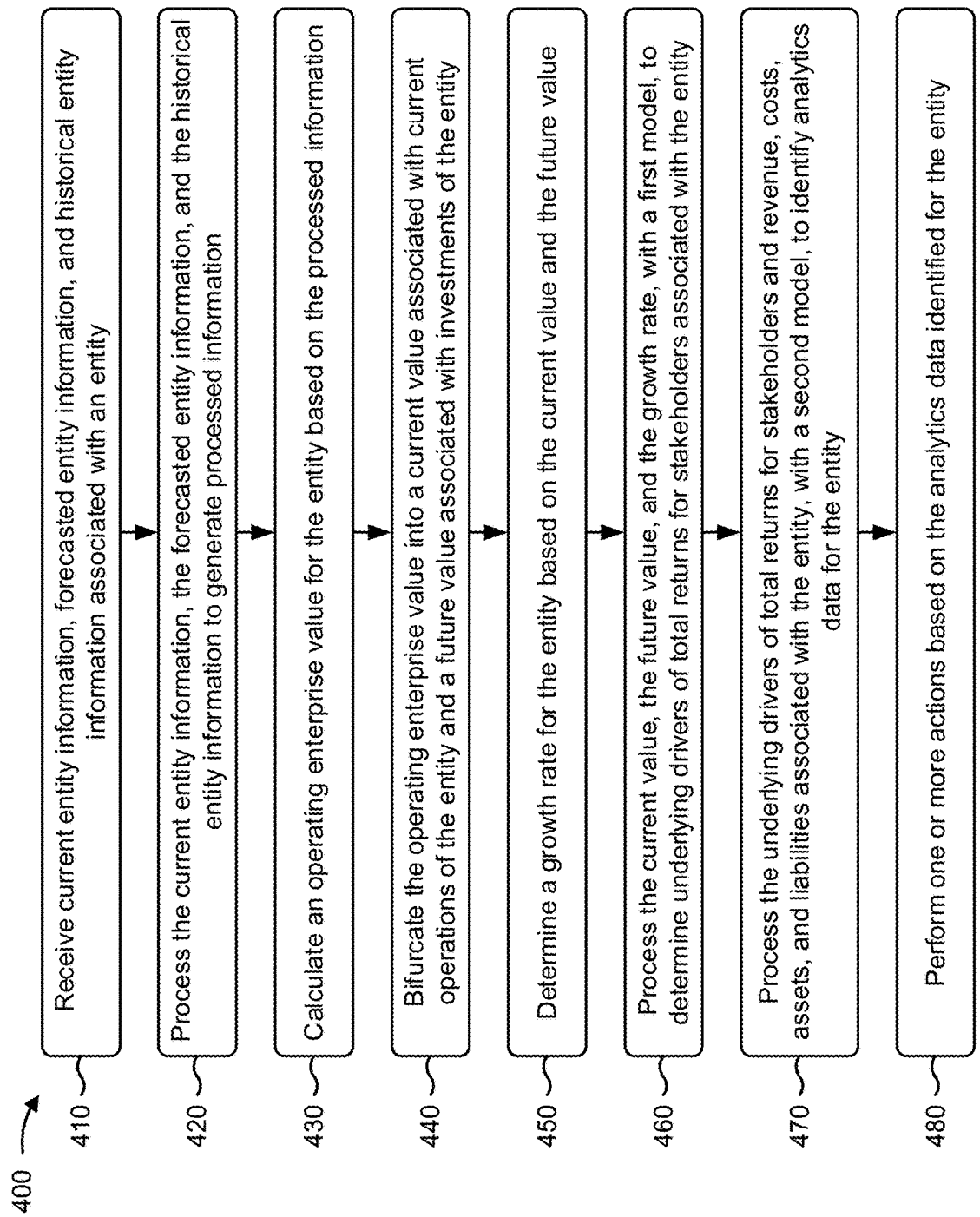
FIGS. 4-6 are flow charts of example processes for utilizing econometric and machine learning models to identify analytics data for an entity.

FIG. 4 is a flow chart of an example process 400 for utilizing econometric and machine learning models to identify analytics data for an entity. In some implementations, one or more process blocks of FIG. 4 may be performed by analytics data platform (e.g., analytics data platform 220). In some implementations, one or more process blocks of FIG. 4 may be performed by another device or a group of devices separate from or including the analytics data platform, such as a client device (e.g., client device 210) and/or a server device (e.g., server device 240).

As shown in FIG. 4, process 400 may include receiving current entity information, forecasted entity information, and historical entity information associated with an entity (block 410). For example, the analytics data platform (e.g., using computing resource 224, processor 320, communication interface 370, and/or the like) may receive current entity information, forecasted entity information, and historical entity information associated with an entity, as described above in connection with FIGS. 1A-2.

As further shown in FIG. 4, process 400 may include processing the current entity information, the forecasted entity information, and the historical entity information to generate processed information (block 420). For example, the analytics data platform (e.g., using computing resource 224, processor 320, memory 330, and/or the like) may process the current entity information, the forecasted entity information, and the historical entity information to generate processed information, as described above in connection with FIGS. 1A-2.

As further shown in FIG. 4, process 400 may include calculating an operating enterprise value for the entity based on the processed information (block 430). For example, the analytics data platform (e.g., using computing resource 224, processor 320, storage component 340, and/or the like) may calculate an operating enterprise value for the entity based on the processed information, as described above in connection with FIGS. 1A-2.

As further shown in FIG. 4, process 400 may include bifurcating the operating enterprise value into a current value associated with current operations of the entity and a future value associated with investments of the entity (block 440). For example, the analytics data platform (e.g., using computing resource 224, processor 320, memory 330, and/or the like) may bifurcate the operating enterprise value into a current value associated with current operations of the entity and a future value associated with investments of the entity, as described above in connection with FIGS. 1A-2.

As further shown in FIG. 4, process 400 may include determining a growth rate for the entity based on the current value and the future value (block 450). For example, the analytics data platform (e.g., using computing resource 224, processor 320, storage component 340, and/or the like) may determine a growth rate for the entity based on the current value and the future value, as described above in connection with FIGS. 1A-2.

As further shown in FIG. 4, process 400 may include processing the current value, the future value, and the growth rate, with a first model, to determine underlying drivers of total returns for stakeholders associated with the entity (block 460). For example, the analytics data platform (e.g., using computing resource 224, processor 320, memory 330, communication interface 370, and/or the like) may process the current value, the future value, and the growth rate, with a first model, to determine underlying drivers of total returns for stakeholders associated with the entity, as described above in connection with FIGS. 1A-2.

As further shown in FIG. 4, process 400 may include processing the underlying drivers of total returns for stakeholders and revenue, costs, assets, and liabilities associated with the entity, with a second model, to identify analytics data for the entity (block 470). For example, the analytics data platform (e.g., using computing resource 224, processor 320, storage component 340, and/or the like) may process the underlying drivers of total returns for stakeholders and revenue, costs, assets, and liabilities associated with the entity, with a second model, to identify analytics data for the entity, as described above in connection with FIGS. 1A-2.

As further shown in FIG. 4, process 400 may include performing one or more actions based on the analytics data identified for the entity (block 470). For example, the analytics data platform (e.g., using computing resource 224, processor 320, memory 330, storage component 340, output component 360, communication interface 370, and/or the like) may perform one or more actions based on the analytics data identified for the entity, as described above in connection with FIGS. 1A-2.

Process 400 may include additional implementations, such as any single implementation or any combination of implementations described below and/or described with regard to any other process described herein.

In some implementations, when performing the one or more actions, the analytics data platform may provide, based on the analytics data, a task to a client device associated with the entity, may generate, based on the analytics data, a calendar entry for a client device associated with the entity, may contact, via a client device, a user associated with the entity regarding the analytics data, may provide an alert, to a client device associated with the entity, regarding the analytics data, may cause a client device associated with the entity to perform a task based on the analytics data, and/or may provide, to a client device associated with the entity, a user interface that includes information indicating the analytics data.

In some implementations, when performing the one or more actions, the analytics data platform may cause a chat bot agent to recommend a task for a client device associated with the entity based on the analytics data, and/or may cause a robot to perform a task based on the analytics data. In some implementations, the analytics data platform may determine the revenue, costs, assets, and liabilities associated with the entity based on the processed information.

In some implementations, the first model may include an econometric model and the second model may include a machine learning model. In some implementations, the analytics data platform may receive current competitor information and historical competitor information associated with competitors of the entity, and/or may generate the processed information based on the current entity information, the forecasted entity information, the historical entity information, the current competitor information, and the historical competitor information.

In some implementations, when calculating the operating enterprise value for the entity, the analytics data platform may classify assets and liabilities of the entity into an operating asset class and a non-operating asset class, may determine market values for the operating asset class and the non-operating asset class, and may calculate the operating enterprise value for the entity based on determining the market values for the operating asset class and the non-operating asset class.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
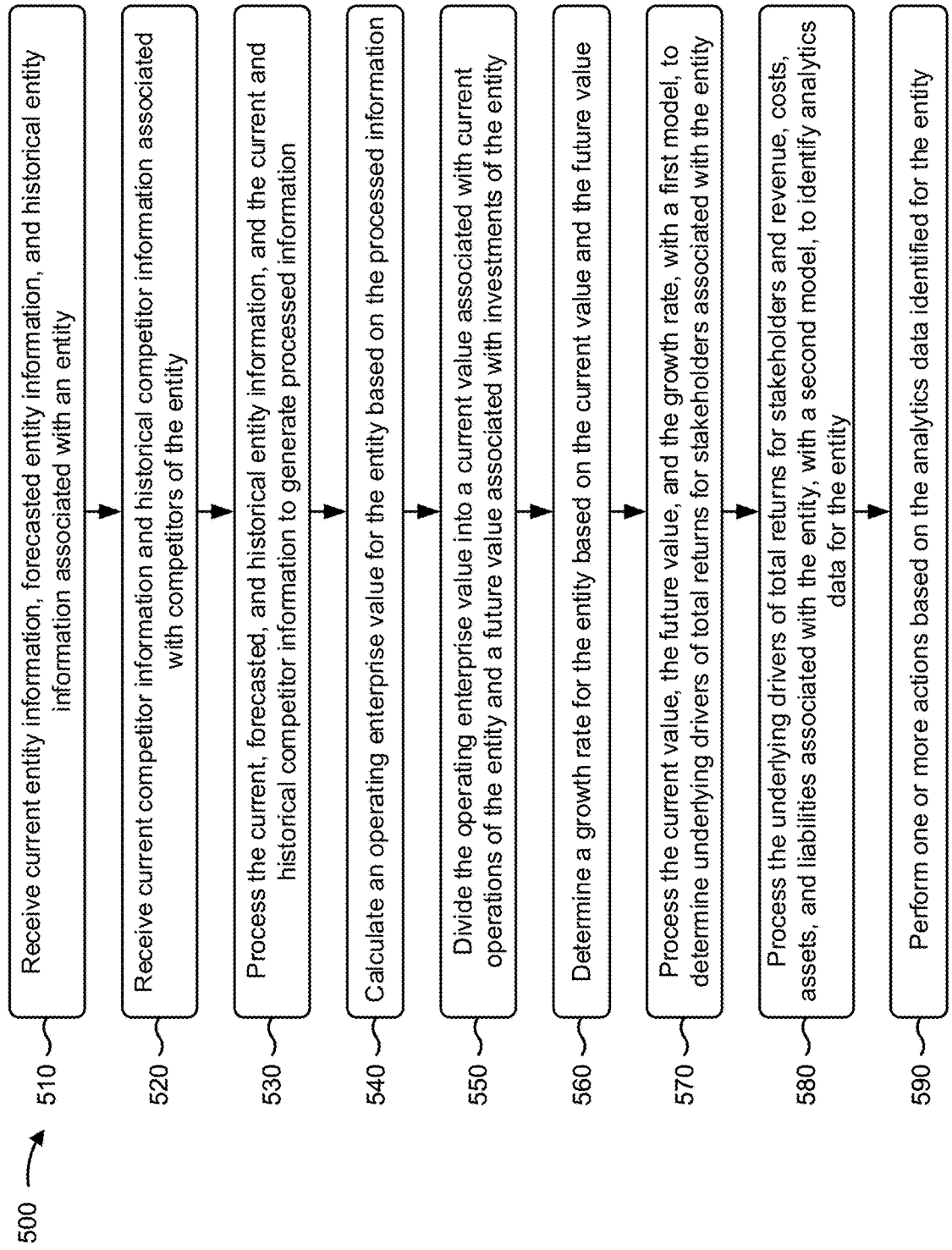

FIG. 5 is a flow chart of an example process 500 for utilizing econometric and machine learning models to identify analytics data for an entity. In some implementations, one or more process blocks of FIG. 5 may be performed by analytics data platform (e.g., analytics data platform 220). In some implementations, one or more process blocks of FIG. 5 may be performed by another device or a group of devices separate from or including the analytics data platform, such as a client device (e.g., client device 210) and/or a server device (e.g., server device 240).

As shown in FIG. 5, process 500 may include receiving current entity information, forecasted entity information, and historical entity information associated with an entity (block 510). For example, the analytics data platform (e.g., using computing resource 224, processor 320, communication interface 370, and/or the like) may receive current entity information, forecasted entity information, and historical entity information associated with an entity, as described above in connection with FIGS. 1A-2.

As further shown in FIG. 5, process 500 may include receiving current competitor information and historical competitor information associated with competitors of the entity (block 520). For example, the analytics data platform (e.g., using computing resource 224, processor 320, communication interface 370, and/or the like) may receive current competitor information and historical competitor information associated with competitors of the entity, as described above in connection with FIGS. 1A-2.

As further shown in FIG. 5, process 500 may include processing the current entity information, the forecasted entity information, the historical entity information, the current competitor information, and the historical competitor information to generate processed information (block 530). For example, the analytics data platform (e.g., using computing resource 224, processor 320, memory 330, and/or the like) may process the current entity information, the forecasted entity information, the historical entity information, the current competitor information, and the historical competitor information to generate processed information, as described above in connection with FIGS. 1A-2.

As further shown in FIG. 5, process 500 may include calculating an operating enterprise value for the entity based on the processed information (block 540). For example, the analytics data platform (e.g., using computing resource 224, processor 320, storage component 340, and/or the like) may calculate an operating enterprise value for the entity based on the processed information, as described above in connection with FIGS. 1A-2.

As further shown in FIG. 5, process 500 may include dividing the operating enterprise value into a current value associated with current operations of the entity and a future value associated with investments of the entity (block 550). For example, the analytics data platform (e.g., using computing resource 224, processor 320, memory 330, and/or the like) may divide the operating enterprise value into a current value associated with current operations of the entity and a future value associated with investments of the entity, as described above in connection with FIGS. 1A-2.

As further shown in FIG. 5, process 500 may include determining a growth rate for the entity based on the current value and the future value (block 560). For example, the analytics data platform (e.g., using computing resource 224, processor 320, memory 330, and/or the like) may determine a growth rate for the entity based on the current value and the future value, as described above in connection with FIGS. 1A-2.

As further shown in FIG. 5, process 500 may include processing the current value, the future value, and the growth rate, with a first model, to determine underlying drivers of total returns for stakeholders associated with the entity (block 570). For example, the analytics data platform (e.g., using computing resource 224, processor 320, storage component 340, communication interface 370, and/or the like) may process the current value, the future value, and the growth rate, with a first model, to determine underlying drivers of total returns for stakeholders associated with the entity, as described above in connection with FIGS. 1A-2.

As further shown in FIG. 5, process 500 may include processing the underlying drivers of total returns for stakeholders and revenue, costs, assets, and liabilities associated with the entity, with a second model, to identify analytics data for the entity (block 580). For example, the analytics data platform (e.g., using computing resource 224, processor 320, memory 330, communication interface 370, and/or the like) may process the underlying drivers of total returns for stakeholders and revenue, costs, assets, and liabilities associated with the entity, with a second model, to identify analytics data for the entity, as described above in connection with FIGS. 1A-2.

As further shown in FIG. 5, process 500 may include performing one or more actions based on the analytics data identified for the entity (block 590). For example, the analytics data platform (e.g., using computing resource 224, processor 320, storage component 340, input component 350, output component 360, communication interface 370, and/or the like) may perform one or more actions based on the analytics data identified for the entity, as described above in connection with FIGS. 1A-2.

Process 500 may include additional implementations, such as any single implementation or any combination of implementations described below and/or described with regard to any other process described herein.

In some implementations, when performing the one or more actions, the analytics data platform may provide, based on the analytics data, a task to a client device associated with the entity; may generate, based on the analytics data, a calendar entry for a client device associated with the entity; may contact, via a client device, a user associated with the entity regarding the analytics data; may provide an alert, to a client device associated with the entity, regarding the analytics data; may cause a client device associated with the entity to perform a task based on the analytics data; may provide, to a client device associated with the entity, a user interface that includes information indicating the analytics data; may cause a chat bot agent to recommend a task for a client device associated with entity based on the analytics data; and/or may cause a robot to perform a task based on the analytics data.

In some implementations, when determining the growth rate for the entity, the analytics data platform may calculate a short-term growth rate, a mid-term growth rate, and a long-term growth rate for the entity based on the current value and the future value. In some implementations, when processing the current value, the future value, and the growth rate with the first model, the analytics data platform may process the current value, the future value, and the growth rate, with the first model, to determine information associated with revenue, margins, investor expectations, dividends, and capital structure decisions of the entity, and may determine the underlying drivers of total returns for stakeholders associated with the entity based on the information associated with the revenue, the margins, the investor expectations, the dividends, and the capital structure decisions of the entity.

In some implementations, when processing the underlying drivers of total returns for stakeholders and the revenue, costs, assets, and liabilities associated with the entity, the analytics data platform may adjust the underlying drivers of total returns for stakeholders based on the revenue, costs, assets, and liabilities associated with the entity, and may identify the analytics data for the entity based on adjusting the underlying drivers of total returns for stakeholders.

In some implementations, when calculating the operating enterprise value for the entity, the analytics data platform may classify assets and the liabilities of the entity into an operating asset class and a non-operating asset class, may determine market values for the operating asset class and the non-operating asset class, and may calculate the operating enterprise value for the entity based on determining the market values for the operating asset class and the non-operating asset class.

In some implementations, the current entity information may include financial information associated with the entity, geographic and business segment information associated with the entity, analyst rating information associated with the entity, share price information associated with the entity, dividend yield information associated with the entity, and/or equity information associated with the entity.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
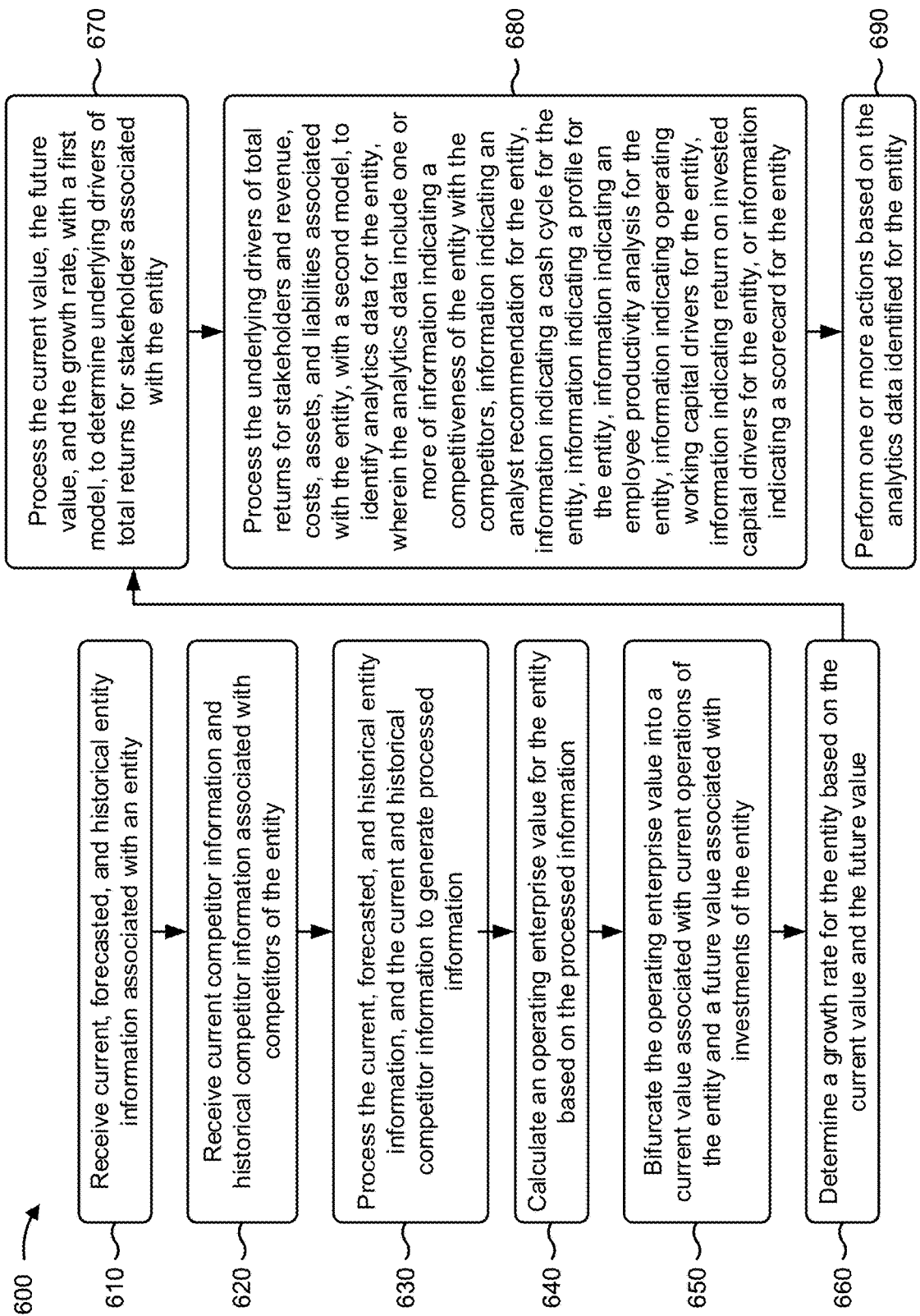

FIG. 6 is a flow chart of an example process 600 for utilizing econometric and machine learning models to identify analytics data for an entity. In some implementations, one or more process blocks of FIG. 6 may be performed by analytics data platform (e.g., analytics data platform 220). In some implementations, one or more process blocks of FIG. 6 may be performed by another device or a group of devices separate from or including the analytics data platform, such as a client device (e.g., client device 210) and/or a server device (e.g., server device 240).

As shown in FIG. 6, process 600 may include receiving current entity information, forecasted entity information, and historical entity information associated with an entity (block 610). For example, the analytics data platform (e.g., using computing resource 224, processor 320, communication interface 370, and/or the like) may receive current entity information, forecasted entity information, and historical entity information associated with an entity, as described above in connection with FIGS. 1A-2.

As further shown in FIG. 6, process 600 may include receiving current competitor information and historical competitor information associated with competitors of the entity (block 620). For example, the analytics data platform (e.g., using computing resource 224, processor 320, communication interface 370, and/or the like) may receive current competitor information and historical competitor information associated with competitors of the entity, as described above in connection with FIGS. 1A-2.

As further shown in FIG. 6, process 600 may include processing the current entity information, the forecasted entity information, the historical entity information, the current competitor information, and the historical competitor information to generate processed information (block 630). For example, the analytics data platform (e.g., using computing resource 224, processor 320, storage component 340, and/or the like) may process the current entity information, the forecasted entity information, the historical entity information, the current competitor information, and the historical competitor information to generate processed information, as described above in connection with FIGS. 1A-2.

As further shown in FIG. 6, process 600 may include calculating an operating enterprise value for the entity based on the processed information (block 640). For example, the analytics data platform (e.g., using computing resource 224, processor 320, memory 330, and/or the like) may calculate an operating enterprise value for the entity based on the processed information, as described above in connection with FIGS. 1A-2.

As further shown in FIG. 6, process 600 may include bifurcating the operating enterprise value into a current value associated with current operations of the entity and a future value associated with investments of the entity (block 650). For example, the analytics data platform (e.g., using computing resource 224, processor 320, memory 330, storage component 340, and/or the like) may bifurcate the operating enterprise value into a current value associated with current operations of the entity and a future value associated with investments of the entity, as described above in connection with FIGS. 1A-2.

As further shown in FIG. 6, process 600 may include determining a growth rate for the entity based on the current value and the future value (block 660). For example, the analytics data platform (e.g., using computing resource 224, processor 320, memory 330, and/or the like) may determine a growth rate for the entity based on the current value and the future value, as described above in connection with FIGS. 1A-2.

As further shown in FIG. 6, process 600 may include processing the current value, the future value, and the growth rate, with a first model, to determine underlying drivers of total returns for stakeholders associated with the entity (block 670). For example, the analytics data platform (e.g., using computing resource 224, processor 320, storage component 340, communication interface 370, and/or the like) may process the current value, the future value, and the growth rate, with a first model, to determine underlying drivers of total returns for stakeholders associated with the entity, as described above in connection with FIGS. 1A-2.

As further shown in FIG. 6, process 600 may include processing the underlying drivers of total returns for stakeholders and revenue, costs, assets, and liabilities associated with the entity, with a second model, to identify analytics data for the entity, wherein the analytics data include information indicating a competitiveness of the entity with the competitors, information indicating an analyst recommendation for the entity, information indicating a cash cycle for the entity, information indicating a profile for the entity, information indicating an employee productivity analysis for the entity, information indicating operating working capital drivers for the entity, information indicating return on invested capital drivers for the entity, and/or information indicating a scorecard for the entity (block 680). For example, the analytics data platform (e.g., using computing resource 224, processor 320, storage component 340, and/or the like) may process the underlying drivers of total returns for stakeholders and revenue, costs, assets, and liabilities associated with the entity, with a second model, to identify analytics data for the entity, as described above in connection with FIGS. 1A-2. In some implementations, the analytics data may include information indicating a competitiveness of the entity with the competitors, information indicating an analyst recommendation for the entity, information indicating a cash cycle for the entity, information indicating a profile for the entity, information indicating an employee productivity analysis for the entity, information indicating operating working capital drivers for the entity, information indicating return on invested capital drivers for the entity, and/or information indicating a scorecard for the entity.

As further shown in FIG. 6, process 600 may include performing one or more actions based on the analytics data identified for the entity (block 690). For example, the analytics data platform (e.g., using computing resource 224, processor 320, memory 330, storage component 340, output component 360, communication interface 370, and/or the like) may perform one or more actions based on the analytics data identified for the entity, as described above in connection with FIGS. 1A-2.

Process 600 may include additional implementations, such as any single implementation or any combination of implementations described below and/or described with regard to any other process described herein.

In some implementations, when performing the one or more actions, the analytics data platform may provide, based on the analytics data, a task to a client device associated with the entity; may generate, based on the analytics data, a calendar entry for a client device associated with the entity; may contact, via a client device, a user associated with the entity regarding the analytics data; may provide an alert, to a client device associated with the entity, regarding the analytics data; may cause a client device associated with the entity to perform a task based on the analytics data; may provide, to a client device associated with the entity, a user interface that includes information indicating the analytics data; may cause a chat bot agent to take to recommend a task for a client device associated with entity based on the analytics data; and/or may cause a robot to perform a task based on the analytics data.

In some implementations, when determining the growth rate for the entity, the analytics data platform may calculate a short-term growth rate, a mid-term growth rate, and a long-term growth rate for the entity based on the current value and the future value, and may determine the growth rate for the entity based on the short-term growth rate, the mid-term growth rate, and the long-term growth rate.

In some implementations, when processing the current value, the future value, and the growth rate with the first model, the analytics data platform may process the current value, the future value, and the growth rate, with the first model, to determine information associated with revenue, margins, investor expectations, dividends, and capital structure decisions of the entity, and may determine the underlying drivers of total returns for stakeholders associated with the entity based on the information associated with the revenue, the margins, the investor expectations, the dividends, and the capital structure decisions of the entity.

In some implementations, when processing the underlying drivers of total returns for stakeholders and the revenue, costs, assets, and liabilities associated with the entity, the analytics data platform may adjust the underlying drivers of total returns for stakeholders based on the revenue, costs, assets, and liabilities associated with the entity, and may identify the analytics data for the entity based on adjusting the underlying drivers of total returns for stakeholders.

In some implementations, when calculating the operating enterprise value for the entity, the analytics data platform may classify assets and liabilities of the entity into an operating asset class and a non-operating asset class, may determine market values for the operating asset class and the non-operating asset class, and may calculate the operating enterprise value for the entity based on determining the market values for the operating asset class and the non-operating asset class.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, current entity information, forecasted entity information, and historical entity information associated with an entity;
   processing, by the device, the current entity information, the forecasted entity information and the historical entity information to generate processed information;
   calculating, by the device, an operating enterprise value for the entity based on the processed information;
   bifurcating, by the device, the operating enterprise value into a current value associated with current operations of the entity and a future value associated with investments of the entity;
   determining, by the device, a growth rate for the entity based on the current value and the future value;
   processing, by the device and with an econometric model, the current value, the future value, and the growth rate to determine underlying drivers of total returns for stakeholders associated with the entity,
      the econometric model applying differential calculus to the current value, the future value, and the growth rate to determine drivers that impact the underlying drivers of total returns for stakeholders;
   training, by the device, a machine learning model using a logistic regression technique,
      the machine learning model receiving historical underlying drivers of total returns for stakeholders and determining a categorical outcome;
   processing, by the device and with the trained machine learning model, the underlying drivers of total returns for stakeholders and revenue, costs, assets, and liabilities associated with the entity and identifying analytics data for the entity,
      wherein the analytics data include one or more of:
         information indicating a competitiveness of the entity with competitors,
         information indicating an analyst recommendation for the entity,
         information indicating a cash cycle for the entity,
         information indicating a profile for the entity,
         information indicating an employee productivity analysis for the entity,
         information indicating operating working capital drivers for the entity,
         information indicating return on invested capital drivers for the entity, or
         information indicating a scorecard for the entity; and
   performing, by the device, one or more actions based on the analytics data identified for the entity.

2. The method of claim 1, wherein performing the one or more actions comprises one or more of:
   providing, based on the analytics data, a task to a client device;
   generating, based on the analytics data, a calendar entry for a client device associated with the entity;
   contacting, via a client device, a user associated with the entity regarding the analytics data;
   providing an alert, to a client device associated with the entity, regarding the analytics data;
   causing a client device associated with the entity to perform a task based on the analytics data; or
   providing, to a client device associated with the entity, a user interface that includes information indicating the analytics data.

3. The method of claim 1, further comprising:
   determining the revenue, costs, assets, and liabilities associated with the entity based on the processed information.

4. The method of claim 1, further comprising:
   receiving current competitor information and historical competitor information associated with competitors of the entity; and
   generating the processed information based on the current entity information, the forecasted entity information, the historical entity information, the current competitor information, and the historical competitor information.

5. The method of claim 1, wherein calculating the operating enterprise value for the entity comprises:
   classifying assets and the liabilities of the entity into an operating asset class and a non-operating asset class;
   determining market values for the operating asset class and the non-operating asset class; and
   calculating the operating enterprise value for the entity based on determining the market values for the operating asset class and the non-operating asset class.

6. A device, comprising:
   one or more memories; and
   one or more processors, communicatively coupled to the one or more memories, to:
      receive current entity information, forecasted entity information, and historical entity information associated with an entity;
      receive current competitor information and historical competitor information associated with competitors of the entity;
      process the current entity information, the forecasted entity information, the historical entity information, the current competitor information, and the historical competitor information to generate processed information;
      calculate an operating enterprise value for the entity based on the processed information;
      divide the operating enterprise value into a current value associated with current operations of the entity and a future value associated with investments of the entity;
      determine a growth rate for the entity based on the current value and the future value;

process, with an econometric model, the current value, the future value, and the growth rate to determine underlying drivers of total returns for stakeholders associated with the entity,
the econometric model applying differential calculus to the current value, the future value, and the growth rate to determine drivers that impact the underlying drivers of total returns for stakeholders;
train a machine learning model using a logistic regression technique,
the machine learning model receiving historical underlying drivers of total returns for stakeholders and determining a categorical outcome;
process, with the trained machine learning model, the underlying drivers of total returns for stakeholders and revenue, costs, assets, and liabilities associated with the entity, with a second model, to identify analytics data for the entity,
wherein the analytics data include one or more of:
information indicating a competitiveness of the entity with the competitors,
information indicating an analyst recommendation for the entity,
information indicating a cash cycle for the entity,
information indicating a profile for the entity,
information indicating an employee productivity analysis for the entity,
information indicating operating working capital drivers for the entity,
information indicating return on invested capital drivers for the entity, or
information indicating a scorecard for the entity; and
perform one or more actions based on the analytics data identified for the entity.

7. The device of claim 6, wherein, when performing the one or more actions, the one or more processors are to one or more of:
provide, based on the analytics data, a task to a client device associated with the entity;
generate, based on the analytics data, a calendar entry for a client device associated with the entity;
contact, via a client device, a user associated with the entity regarding the analytics data;
provide an alert, to a client device associated with the entity, regarding the analytics data;
cause a client device associated with the entity to perform a task based on the analytics data; or
provide, to a client device associated with the entity, a user interface that includes information indicating the analytics data.

8. The device of claim 6, wherein, when determining the growth rate for the entity, the one or more processors are to:
calculate a short-term growth rate, a mid-term growth rate, and a long-term growth rate for the entity based on the current value and the future value.

9. The device of claim 6, wherein, when processing the current value, the future value, and the growth rate with the econometric model, the one or more processors are to:
process the current value, the future value, and the growth rate, with the econometric model, to determine information associated with revenue, margins, investor expectations, dividends, and capital structure decisions of the entity; and
determine the underlying drivers of total returns for stakeholders associated with the entity based on the information associated with the revenue, the margins, the investor expectations, the dividends, and the capital structure decisions of the entity.

10. The device of claim 6, wherein, when processing the underlying drivers of total returns for stakeholders and the revenue, costs, assets, and liabilities associated with the entity, the one or more processors are to:
adjust the underlying drivers of total returns for stakeholders based on the revenue, costs, assets, and liabilities associated with the entity; and
identify the analytics data for the entity based on adjusting the underlying drivers of total returns for stakeholders.

11. The device of claim 6, wherein, when calculating the operating enterprise value for the entity, the one or more processors are to:
classify assets and the liabilities of the entity into an operating asset class and a non-operating asset class;
determine market values for the operating asset class and the non-operating asset class; and
calculate the operating enterprise value for the entity based on determining the market values for the operating asset class and the non-operating asset class.

12. The device of claim 6, wherein the current entity information includes one or more of:
financial information associated with the entity,
geographic and business segment information associated with the entity,
analyst rating information associated with the entity,
share price information associated with the entity,
dividend yield information associated with the entity, or
equity information associated with the entity.

13. A non-transitory computer-readable medium storing instructions, the instructions comprising:
one or more instructions that, when executed by one or more processors of a device, cause the one or more processors to:
receive current entity information, forecasted entity information, and historical entity information associated with an entity;
receive current competitor information and historical competitor information associated with competitors of the entity;
process the current entity information, the forecasted entity information, the historical entity information, the current competitor information, and the historical competitor information to generate processed information;
calculate an operating enterprise value for the entity based on the processed information;
bifurcate the operating enterprise value into a current value associated with current operations of the entity and a future value associated with investments of the entity;
determine a growth rate for the entity based on the current value and the future value;
process, and with an econometric model, the current value, the future value, and the growth rate to determine underlying drivers of total returns for stakeholders associated with the entity,
the econometric model applying differential calculus to the current value, the future value, and the growth rate to determine drivers that impact the underlying drivers of total returns for stakeholders;
train a machine learning model using a logistic regression technique, the machine learning model receiving historical underlying drivers of total returns for stakeholders and determining a categorical outcome;

process, with the trained machine learning model, the underlying drivers of total returns for stakeholders and revenue, costs, assets, and liabilities associated with the entity to identify analytics data for the entity, wherein the analytics data include one or more of:
information indicating a competitiveness of the entity with the competitors,
information indicating an analyst recommendation for the entity,
information indicating a cash cycle for the entity,
information indicating a profile for the entity,
information indicating an employee productivity analysis for the entity,
information indicating operating working capital drivers for the entity,
information indicating return on invested capital drivers for the entity, or
information indicating a scorecard for the entity; and perform one or more actions based on the analytics data identified for the entity.

14. The non-transitory computer-readable medium of claim 13, wherein the one or more instructions, that cause the one or more processors to perform the one or more actions, cause the one or more processors to one or more of:
provide, based on the analytics data, a task to a client device associated with the entity;
generate, based on the analytics data, a calendar entry for a client device associated with the entity;
contact, via a client device, a user associated with the entity regarding the analytics data;
provide an alert, to a client device associated with the entity, regarding the analytics data;
cause a client device associated with the entity to perform a task based on the analytics data; or
provide, to a client device associated with the entity, a user interface that includes information indicating the analytics data.

15. The non-transitory computer-readable medium of claim 13, wherein the one or more instructions, that cause the one or more processors to determine the growth rate for the entity, cause the one or more processors are to:
calculate a short-term growth rate, a mid-term growth rate, and a long-term growth rate for the entity based on the current value and the future value; and
determine the growth rate for the entity based on the short-term growth rate, the mid-term growth rate, and the long-term growth rate.

16. The non-transitory computer-readable medium of claim 13, wherein the one or more instructions, that cause the one or more processors to process the current value, the future value, and the growth rate with the econometric model, cause the one or more processors to:
process the current value, the future value, and the growth rate, with the econometric model, to determine information associated with revenue, margins, investor expectations, dividends, and capital structure decisions of the entity; and
determine the underlying drivers of total returns for stakeholders associated with the entity based on the information associated with the revenue, the margins, the investor expectations, the dividends, and the capital structure decisions of the entity.

17. The non-transitory computer-readable medium of claim 13, wherein the one or more instructions, that cause the one or more processors to process the underlying drivers of total returns for stakeholders and the revenue, costs, assets, and liabilities associated with the entity, cause the one or more processors to:
adjust the underlying drivers of total returns for stakeholders based on the revenue, costs, assets, and liabilities associated with the entity; and
identify the analytics data for the entity based on adjusting the underlying drivers of total returns for stakeholders.

18. The non-transitory computer-readable medium of claim 13, wherein the one or more instructions, that cause the one or more processors to calculate the operating enterprise value for the entity, causes the one or more processors to:
classify assets and liabilities of the entity into an operating asset class and a non-operating asset class;
determine market values for the operating asset class and the non-operating asset class; and
calculate the operating enterprise value for the entity based on determining the market values for the operating asset class and the non-operating asset class.

19. The method of claim 1, where processing the current value, the future value, and the growth rate with the econometric model comprises:
processing the current value, the future value, and the growth rate, with the econometric model, to determine information associated with revenue, margins, investor expectations, dividends, and capital structure decisions of the entity; and
determining the underlying drivers of total returns for stakeholders associated with the entity based on the information associated with the revenue, the margins, the investor expectations, the dividends, and the capital structure decisions of the entity.

* * * * *